(12) United States Patent
Narasimhan et al.

(10) Patent No.: US 9,391,858 B2
(45) Date of Patent: *Jul. 12, 2016

(54) HOST INFORMATION COLLECTION

(75) Inventors: Srinivasan Narasimhan, Bangalore (IN); Parthiv Hejmadi, Bangalore (IN); Vinod Kumar A. Porwal, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/574,082

(22) Filed: Oct. 6, 2009

(65) Prior Publication Data

US 2011/0055381 A1    Mar. 3, 2011

Related U.S. Application Data

(63) Continuation of application No. PCT/IN2009/000486, filed on Sep. 3, 2009.

(51) Int. Cl.
*H04L 12/26* (2006.01)
*H04L 12/24* (2006.01)

(52) U.S. Cl.
CPC .......... *H04L 43/0811* (2013.01); *H04L 41/046* (2013.01); *H04L 41/0893* (2013.01); *H04L 41/12* (2013.01)

(58) Field of Classification Search
USPC .................. 709/223–225; 726/1, 5–7, 26–29
See application file for complete search history.

(56) References Cited

U.S. PATENT DOCUMENTS

| | | |
|---|---|---|
| 5,235,642 A | 8/1993 | Wobber et al. |
| 5,832,483 A | 11/1998 | Barker |
| 5,987,610 A | 11/1999 | Franczek et al. |
| 6,058,480 A | 5/2000 | Brown |
| 6,073,142 A | 6/2000 | Geiger et al. |
| 6,101,608 A | 8/2000 | Schmidt et al. |
| 6,460,050 B1 | 10/2002 | Pace et al. |

(Continued)

FOREIGN PATENT DOCUMENTS

| | | |
|---|---|---|
| WO | WO 2007/148244 | 12/2007 |
| WO | WO 2011/027352 | 3/2011 |

OTHER PUBLICATIONS

International Search Report and the Written Opinion of the International Searching Authority, or the Declaration, PCT/IN/09/00486, Feb. 16, 2010, 21 pages.

(Continued)

*Primary Examiner* — Greg C Bengzon
(74) *Attorney, Agent, or Firm* — Patent Capital Group

(57) ABSTRACT

Methods, systems, and apparatus, including computer programs encoded on a computer storage medium, for collecting information of host devices. In one aspect, a method includes transmitting a plurality of information probes to the host device, including an agent probe that queries an agent installed on the host device for a unique agent identifier, monitoring for replies to the information probes from the host device during the host detection phase, ending the host detection phase in response to receiving a reply to the agent probe and that includes the unique agent identifier, resending the plurality of information probes and incrementing a repeat counter in response to not receiving a reply to the agent probe after the expiration of a time period and ending the host detection phase in response to a value of the repeat counter exceeding a maximum repeat value.

20 Claims, 10 Drawing Sheets

(56) References Cited

U.S. PATENT DOCUMENTS

| | | | |
|---|---|---|---|
| 6,505,245 B1* | 1/2003 | North et al. | 709/223 |
| 6,615,264 B1* | 9/2003 | Stoltz et al. | 709/227 |
| 6,678,828 B1 | 1/2004 | Pham et al. | |
| 6,711,400 B1 | 3/2004 | Aura | |
| 6,816,973 B1* | 11/2004 | Gleichauf et al. | 726/13 |
| 6,862,286 B1* | 3/2005 | Tams et al. | 370/401 |
| 6,873,988 B2 | 3/2005 | Herrmann et al. | |
| 6,947,726 B2 | 9/2005 | Rockwell | |
| 7,010,807 B1 | 3/2006 | Yanovsky | |
| 7,287,692 B1 | 10/2007 | Patel et al. | |
| 7,383,579 B1* | 6/2008 | Catanzano | 726/24 |
| 7,506,155 B1 | 3/2009 | Stewart et al. | |
| 7,533,416 B2 | 5/2009 | Chawro et al. | |
| 7,574,740 B1* | 8/2009 | Kennis | H04L 63/1433 713/151 |
| 7,647,621 B2 | 1/2010 | Russell et al. | |
| 7,725,558 B2 | 5/2010 | Dickenson | |
| 7,793,338 B1 | 9/2010 | Beddoe et al. | |
| 7,805,752 B2 | 9/2010 | Newstadt et al. | |
| 7,814,535 B1 | 10/2010 | Barlie et al. | |
| 7,827,545 B2 | 11/2010 | Choe et al. | |
| 7,827,607 B2 | 11/2010 | Sobel et al. | |
| 7,836,501 B2 | 11/2010 | Sobel et al. | |
| 7,882,538 B1 | 2/2011 | Palmer | |
| 8,001,610 B1 | 8/2011 | Chickering et al. | |
| 8,051,466 B2 | 11/2011 | Sellin et al. | |
| 8,127,359 B2 | 2/2012 | Kelekar | |
| 8,131,849 B2 | 3/2012 | Narasimhan | |
| 8,234,705 B1 | 7/2012 | Roskind et al. | |
| 8,291,498 B1* | 10/2012 | Liang et al. | 726/24 |
| 8,499,330 B1* | 7/2013 | Albisu et al. | 726/1 |
| 8,539,582 B1* | 9/2013 | Aziz et al. | 726/24 |
| 8,583,792 B2 | 11/2013 | Narasimhan | |
| 8,671,181 B2 | 3/2014 | Narasimhan | |
| 8,881,234 B2 | 11/2014 | Narasimhan et al. | |
| 8,924,721 B2 | 12/2014 | Narasimhan | |
| 9,049,118 B2 | 6/2015 | Narasimhan | |
| 2002/0077786 A1 | 6/2002 | Vogel et al. | |
| 2002/0184533 A1 | 12/2002 | Fox | |
| 2003/0023711 A1* | 1/2003 | Parmar et al. | 709/223 |
| 2003/0051155 A1 | 3/2003 | Martin | |
| 2003/0212779 A1* | 11/2003 | Boyter et al. | 709/223 |
| 2003/0229808 A1 | 12/2003 | Heintz et al. | |
| 2003/0233541 A1 | 12/2003 | Fowler et al. | |
| 2004/0003241 A1 | 1/2004 | Sengodan et al. | |
| 2004/0015579 A1 | 1/2004 | Cooper et al. | |
| 2004/0075535 A1 | 4/2004 | Propp et al. | |
| 2004/0210654 A1 | 10/2004 | Hrastar | |
| 2005/0050337 A1* | 3/2005 | Liang et al. | 713/188 |
| 2005/0089048 A1* | 4/2005 | Chittenden et al. | 370/395.54 |
| 2005/0097199 A1 | 5/2005 | Woodard et al. | |
| 2005/0125526 A1* | 6/2005 | Chou | 709/223 |
| 2005/0213519 A1 | 9/2005 | Relan et al. | |
| 2005/0228874 A1* | 10/2005 | Edgett et al. | 709/220 |
| 2005/0273853 A1 | 12/2005 | Oba et al. | |
| 2006/0010485 A1* | 1/2006 | Gorman | 726/3 |
| 2006/0067220 A1* | 3/2006 | Poletto et al. | 370/230.1 |
| 2006/0069912 A1 | 3/2006 | Zheng et al. | |
| 2006/0070129 A1 | 3/2006 | Sobel et al. | |
| 2006/0090023 A1 | 4/2006 | Olsen et al. | |
| 2006/0143700 A1 | 6/2006 | Herrmann | |
| 2006/0195566 A1 | 8/2006 | Hurley | |
| 2006/0200856 A1 | 9/2006 | Salowey et al. | |
| 2006/0239254 A1 | 10/2006 | Short et al. | |
| 2007/0050635 A1 | 3/2007 | Popp | |
| 2007/0101406 A1 | 5/2007 | Zavalkovsky et al. | |
| 2007/0143824 A1 | 6/2007 | Shahbazi | |
| 2007/0143827 A1 | 6/2007 | Nicodemus et al. | |
| 2007/0143851 A1 | 6/2007 | Nicodemus et al. | |
| 2007/0150565 A1* | 6/2007 | Ayyagari et al. | 709/223 |
| 2007/0150934 A1* | 6/2007 | Fiszman et al. | 726/1 |
| 2007/0271363 A1* | 11/2007 | Ross et al. | 709/223 |
| 2008/0028463 A1* | 1/2008 | Dagon | H04L 29/12066 726/22 |
| 2008/0109870 A1* | 5/2008 | Sherlock et al. | 726/1 |
| 2008/0109871 A1 | 5/2008 | Jacobs | |
| 2008/0120699 A1 | 5/2008 | Spear | |
| 2008/0130875 A1 | 6/2008 | Ahlquist | |
| 2008/0163340 A1 | 7/2008 | Cheeniyil et al. | |
| 2008/0189397 A1 | 8/2008 | Atkinson et al. | |
| 2008/0189405 A1* | 8/2008 | Zarenin et al. | 709/224 |
| 2008/0189759 A1 | 8/2008 | Bjugan et al. | |
| 2008/0229421 A1 | 9/2008 | Hudis et al. | |
| 2008/0307488 A1 | 12/2008 | Hammond, II et al. | |
| 2008/0313325 A1* | 12/2008 | Sullivan | 709/224 |
| 2009/0024848 A1 | 1/2009 | Takasugi et al. | |
| 2009/0037998 A1 | 2/2009 | Adhya et al. | |
| 2009/0083400 A1 | 3/2009 | Draca et al. | |
| 2009/0158407 A1 | 6/2009 | Nicodemus et al. | |
| 2009/0178132 A1 | 7/2009 | Hudis et al. | |
| 2009/0199002 A1 | 8/2009 | Erickson | |
| 2009/0235359 A1* | 9/2009 | Abdulhayoglu et al. | 726/25 |
| 2009/0300763 A1 | 12/2009 | Harvey et al. | |
| 2009/0307753 A1 | 12/2009 | Dupont et al. | |
| 2010/0100612 A1 | 4/2010 | Almeida et al. | |
| 2010/0100962 A1* | 4/2010 | Boren | 726/25 |
| 2010/0107257 A1* | 4/2010 | Ollmann | 726/24 |
| 2010/0115578 A1* | 5/2010 | Nice et al. | 726/1 |
| 2010/0125735 A1* | 5/2010 | Zapata et al. | 713/170 |
| 2010/0205675 A1 | 8/2010 | Vogel et al. | |
| 2010/0251329 A1* | 9/2010 | Wei | 726/1 |
| 2010/0281159 A1* | 11/2010 | Boscolo et al. | 709/224 |
| 2010/0325730 A1* | 12/2010 | Cyprus et al. | 726/25 |
| 2011/0055580 A1 | 3/2011 | Narasimhan | |
| 2011/0055907 A1 | 3/2011 | Narasimhan et al. | |
| 2011/0060823 A1* | 3/2011 | Phillippe et al. | 709/224 |
| 2012/0144030 A1 | 6/2012 | Narasimhan | |
| 2012/0304299 A1 | 11/2012 | Kelekar | |
| 2013/0091534 A1* | 4/2013 | Gilde et al. | 726/1 |
| 2013/0167240 A1 | 6/2013 | Kelekar | |
| 2014/0075022 A1 | 3/2014 | Narasimhan | |

OTHER PUBLICATIONS

USPTO Jan. 12, 2012 Nonfinal Office Action from U.S. Appl. No. 12/574,104.

USPTO Feb. 24, 2012 Nonfinal Office Action from U.S. Appl. No. 12/574,090.

RFC2617, Internet Society Requests for Comment (RFC), Franks et al. IPCOM000003204D, Jun. 1999.

RFC4418, Internet Society Requests for Comments (RFC), Krovetz, IPCOM000134528D, Mar. 2006.

USPTO May 24, 2012 Response to Feb. 24, 2012 Nonfinal Office Action from U.S. Appl. No. 12/574,090.

RCE & Amendment filed on May 13, 2013 in response to the Notice of Allowance dated Feb. 13, 2013, received for the U.S. Appl. No. 13/371,956. 14 pages.

Notice of Allowance received for the U.S. Appl. No. 13/371,956, mailed on Jul. 9, 2013. 10 pages.

RCE & Amendment filed on May 22, 2013 in response to the Notice of Allowance dated Feb. 22, 2013, received for the U.S. Appl. No. 12/574,090. 14 pages.

USPTO Sep. 18, 2012 RCE Response to Jun. 18, 2012 Final Office Action from U.S. Appl. No. 12/574,090.

USPTO Oct. 16, 2012 Response to Jul. 16, 2012 Nonfinal Office Action from U.S. Appl. No. 12/574,120.

USPTO Oct. 18, 2012 Nonfinal Office Action from U.S. Appl. No. 12/574,090.

Held (Gilbert Held, Bulletproofing TCP/IP-Based Windows NT/2000 Networks, ISBN 0-470-84160-5, John Wiley & Sons, 2001), Chapter 2, pp. 19-84.

USPTO Oct. 30, 2012 Final Office Action from U.S. Appl. No. 12/574,120.

USPTO Oct. 30, 2012 Notice of Allowance from U.S. Appl. No. 13/371,956.

International Preliminary Report on Patentability and Written Opinion for International Application No. PCT/IN2009/000486 issued Mar. 6, 2012 (15 pages).

USPTO Jan. 18, 2013 Response to Oct. 18, 2012 Nonfinal Office Action from U.S. Appl. No. 12/574,090.

(56) References Cited

OTHER PUBLICATIONS

USPTO Feb. 13, 2013 Notice of Allowance from U.S. Appl. No. 13/371,956.
USPTO Feb. 22, 2013 Final Office Action from U.S. Appl. No. 12/574,090.
Menezes et al. (Alfred J. Menezes, Paul C. van Oorschot, Scott A. Vanstone, "Handbook of applied cryptography", 1997, ISBN: 0849385237).
CNAP (Network Admission Control Framework Deployment Guide, Cisco Systems, C04-332601-0, Feb. 2006).
McAfee Mer for EPO 2.0 Walkthrough Guide, Nov. 2008.
Network Access Control (McAfee, "McAfee Network Access Control 3.0. Product and Installation Guide", 2008.
Trusted Computing Group, "Trusted Network Connect: Enabling Dynamic Interperable Security", Apr. 2009.
USPTO Apr. 5, 2012 Nonfinal Office Action from U.S. Appl. No. 13/371,956.
USPTO Jul. 5, 2012 Response to Apr. 5, 2012 Nonfinal Office Action from U.S. Appl. No. 13/371,956.
Release Notes for McAfee Network Access Control 3.0, Apr. 2009.
USPTO Jun. 18, 2012 Final Office Action from U.S. Appl. No. 12/574,090.
USPTO Jul. 16, 2012 Nonfinal Office Action from U.S. Appl. No. 12/574,120.
USPTO Jul. 23, 2012 Notice of Allowance from U.S. Appl. No. 13/371,956.
USPTO Jul. 25, 2012 Notice of Allowance from U.S. Appl. No. 12/574,104.
USPTO Oct. 31, 2013 Notice of Allowance from U.S. Appl. No. 12/574,104. 20 pages.
USPTO Dec. 18, 2013 Nonfinal Office Action from U.S. Appl. No. 12/574,090, 12 pages.
Helfrich (Helfrich et al, Cisco Network Admission Control, vol. I: NAC Framework Architecture and Design, ISBN: 1-580705-514-5, Oct. 2006, 12 pages.
USPTO Apr. 10, 2014 Final Office Action from U.S. Appl. No. 12/574,090, 14 pages.
USPTO Jun. 26, 2014 Notice of Allowance from U.S. Appl. No. 12/574,120.
USPTO Aug. 19, 2014 Notice of Allowance from U.S. Appl. No. 12/574,090.
USTPO Notice of Allowance received for U.S. Appl. No. 12/574,139, mailed on Oct. 26, 2011, 9 pages.
USPTO Jan. 21, 2015 Notice of Allowance from U.S. Appl. No. 14/077,169, 20 pages.

* cited by examiner

HOST INFORMATION COLLECTION

CROSS-REFERENCE TO RELATED APPLICATION

This application is a continuation of International Application No. PCT/IN2009/000486, filed Sep. 3, 2009, the disclosure of which is incorporated herein by reference.

BACKGROUND

This specification relates to network access control.

Network access control involves regulating access to network resources based on a hosts' health, the identity of a user logged on to the host, or combination of both. As used herein, the term "host" refers to any computer device that is attempting to gain access to a protected network, or that has access to the protected network. A host can be a personal computer, a mobile communication device, a server computer in another network, or any other computer device capable of accessing the protected network. A network access control system protects a network by identifying, assessing, quarantining, and remediating host devices prior to network access and during network access.

The network access control system includes network sensors that are deployed on the edge of a protected network or within the network, and one or more network access control servers in data communication with the network sensors. The sensors detect new host devices attempting to gain access to the network and monitor host devices that have been granted access to the network. The sensors report to the network access control server(s) when new host devices are attempting to gain access to the network, and report actions taken by the host devices. The sensors can take actions with respect to a host device immediately, or can take actions with respect to the host device as determined by the network access control server(s), depending upon the health of the host device and the identity of the user that is logged onto the host device.

When a host device is first attempting to join a network, a sensor must collect information about the host device. Such host information collection is conducted during a host information collection phase. Each sensor has at its disposal one or more information probes that can be used to collect information from a host device. Furthermore, if the host device has installed upon it a network access control agent, the network access control agent can periodically provide beacons that include information about the host device. As there are several different types of information probes that the sensor can use to collect host information, determining how to effectively and efficiently send the information probes to the host device and process the replies can be challenging.

In addition, when a host device has been granted access to a network, the sensors monitor the host device for degradation of the host device health, for the logout of the user, and for when the host goes off-line and attempts to rejoin the network. Accordingly, the host device can go through multiple different states while attempting to access the network and after being granted access to the network. Determining how to manage the host device according to these various states is also challenging.

Additionally, in many network access control systems, sensors can be arranged in a failover configuration. In this failover configuration, a pair of peer sensors is used to control access to a network for host devices. One of the peer sensors is designated a primary sensor and the other peer sensor is designated a secondary sensor. To minimize network traffic, usually only one of the peer sensors is used to probe a host device, and the host status information received at the probing peer sensor is then provided to the non-probing peer sensor. However, one of the peer sensors may have a more reliable communication channel with the host device, or may have a communication channel that facilitates a more robust information probe than the other peer sensor. Accordingly, determining which of the peer sensors should be used to probe the host device can present the design challenge.

Furthermore, there are situations in which the probing peer sensor may be unable to communicate with the host device. For example, a firewall may be enabled that interferes with the probing peer sensors queries, or the host device may go off-line. How the pair of peer sensors responds to the probing sensor detecting the host going off-line can depend on the information probes that each peer sensor can use to probe the host device, and whether the primary peer sensor or the secondary peer sensor is the probing peer sensor. Accordingly, determining how the pair of peer sensors should respond to the probing peer sensor's failure to communicate with the host device should take into account these factors.

Each of the sensors stores a host table that includes a record for each host device that the sensor is monitoring. The record includes information such as the identity of the host, e.g., an IP address, or a MAC address, etc., the identity of the user logon to the host, e.g., a user identifier, and optionally other host device information. The host tables of the peer sensors are synchronized, as the probing peer sensor provides host device information to the non-probing peer sensor. In the event of one of the peer sensors failing, or in the event of a communication link between the peer sensors going down, the host tables of the peer sensors must be synchronized after recovery. As the status of the monitored host devices may have changed while a sensor was rebooting or while the communication link between the peer sensors was recovering, determining which host records in the host table need to be updated and which records do not need to be updated presents design challenges.

Finally, despite numerous security measures, there is always the potential for replay attacks. A replay attack is a form of a network attack in which information for credentials is delayed and/or fraudulently repeated at a later time. An attacker typically intercepts IP traffic to capture the credentials being transmitted from a host device, and then presents the credentials as their own. A common defense against a replay attack is the use of a nonce. For example, when a sensor provides an access portal to facilitate a user login from a host device, or queries an agent on the host device, the sensor will send a nonce to the host device when requesting authentication information, e.g., when requesting a user identifier and password within the HTTP 401 authentication realm, or provide a nonce with the agent query. The host device, in turn, sends a reply that includes an authentication code. When providing login credentials, such as a user identifier, the authentication code is a hash of the user's password and the nonce. The sensor then checks the authentication code by hashing the user's password and the nonce. Provided the hashes match, access is granted. Likewise, a reply to the agent query can include a hash that is, in part, based on the nonce. As the sensor provides a new nonce with each presentation of the access portal or with each agent query, replay attacks are thwarted.

Nonces are typically generated using pseudorandom number generators so that attackers cannot predict what the next nonce will be. However, use of pseudorandom number generators can be processor intensive. Additionally, the sensor may handle many authentication requests, and thus generating a new random number for each authentication request can be expensive in terms of processing resources.

SUMMARY

In general, one innovative aspect of the subject matter described in this specification can be embodied in methods that include the actions of receiving data at the data processing apparatus indicating a host device is connecting to a network; in response to the host device connecting to the network, initiating a host detection phase for the host device during which host attributes of the host are collected by the data processing apparatus and network access for the host device is restricted, and during the host collection phase for the host device: transmitting a plurality of information probes to the host device, the information probes including an agent probe that queries an agent installed on the host device for a unique agent identifier, and each of the information probes requesting one or more other host attributes, monitoring for replies to the information probes from the host device during the host detection phase, ending the host detection phase in response to receiving a reply to the agent probe that includes the unique agent identifier, resending the plurality of information probes and incrementing a repeat counter in response to not receiving a reply to the agent probe after the expiration of a time period; and ending the host detection phase in response to a value of the repeat counter exceeding a maximum repeat value. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating, by the data processing apparatus, a source value; hashing, by the data processing apparatus, the source value to generate a nonce; providing, by the data processing apparatus, the nonce with a query over a network; receiving, in response to the query, reply data and an authentication code; hashing a combination of the reply data and the nonce to generate a digest; and determining the reply is authentic if the digest matches the authentication code. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating, by the data processing apparatus, a plurality of source values; hashing, by the data processing apparatus, the source values to generate hash values; generating, by the data processing apparatus, a nonce from the hash values; providing, by the data processing apparatus, the nonce with a query over a network; receiving, in response to the query, reply data and an authentication code; hashing, by the data processing apparatus, a combination of the reply data and the nonce to generate a digest; and determining, by the data processing apparatus, the reply is authentic if the digest matches the authentication code. Other embodiments of this aspect include corresponding systems, apparatus, and computer programs, configured to perform the actions of the methods, encoded on computer storage devices.

Another innovative aspect of the subject matter described in this specification can be embodied in methods that include the actions of storing in the memory of the data processing apparatus a host table, the host table including, for each of a plurality of host devices monitored on a network, a record including: an IP address field for storing an IP address assigned to the host device, an agent identifier field for storing an agent identifier of agent installed on the host device, and a time stamp field for storing a time stamp indicating the time that host attributes were stored in the record; receiving from a peer data processing apparatus, in response to a synchronization event, a peer record for a host device, the peer record comprising data for a record stored in a host table in the memory of the peer data processing apparatus; determining whether an IP address of the peer record is stored in a record in the host table; in response to determining that the IP address of the peer record is not stored in a record of the host table: determining whether the peer record includes an agent identifier; in response to determining that the peer record includes the agent identifier, determining whether the agent identifier of the peer record is stored in a record of the host table; in response to determining that the agent identifier of the peer record is stored in a record of the host table, determining whether the peer record is more recent than the record of the host table based on the time stamp of the peer record and the time stamp of the records in the host table; and in response to determining that the peer record is more recent than the record of the host table, updating the record in the host table with data of the peer record. Other embodiments of this aspect include corresponding systems, apparatus, and computer programs, configured to perform the actions of the methods, encoded on computer storage devices.

Another innovative aspect of the subject matter described in this specification can be embodied in methods that include the actions of defining a state machine in a memory of the data processing apparatus, the state machine comprising a plurality of states, and wherein network access for a host device is controlled in each state according to one or more network access zones associated with the state, each network access zone defining network access capabilities for the host device; monitoring, by the data processing apparatus, host devices attempting to access the network and host devices that have access to the network; transitioning, for each host device, a state of the host based on the monitoring and a current state of the host; storing in the memory of the data processing apparatus, for each monitored host device attempting to access the network or that has access to the network: host attributes of the host device that identify the host, and the state of the host; and controlling network access of the host device according to the one or more network access zones associated with the state of the host device. Other embodiments of this aspect include corresponding systems, apparatus, and computer programs, configured to perform the actions of the methods, encoded on computer storage devices.

Another innovative aspect of the subject matter described in this specification can be embodied in methods that include the actions of: in response to a detection of a host device attempting to access a network, transmitting, from each of a primary sensor and a secondary sensor, a plurality of information probes to the host device, each of the information probes being prioritized according to their probe types by the primary sensor in a descending priority order; determining, at the primary sensor, a first probe type, the first probe type being the probe type of the highest priority information probe for which a reply from the host device was received at the primary sensor; determining, at the secondary sensor, a second probe type, the second probe type being the probe type of the highest priority information probe for which a reply from the host device was received at the secondary sensor; transmitting, from the secondary sensor, data indicating the second probe type to the primary sensor; determining, at the primary sensor, whether the second probe type is prioritized higher than the first probe type; in response to determining the second probe type is prioritized higher than the first probe type, transmitting, from the primary sensor, data indicating a probe handover to the secondary sensor and precluding further probing of the host device from the primary sensor; and transmitting subsequent information probes to the host device from the secondary sensor.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Network Access Control System Overview

Figure 1:
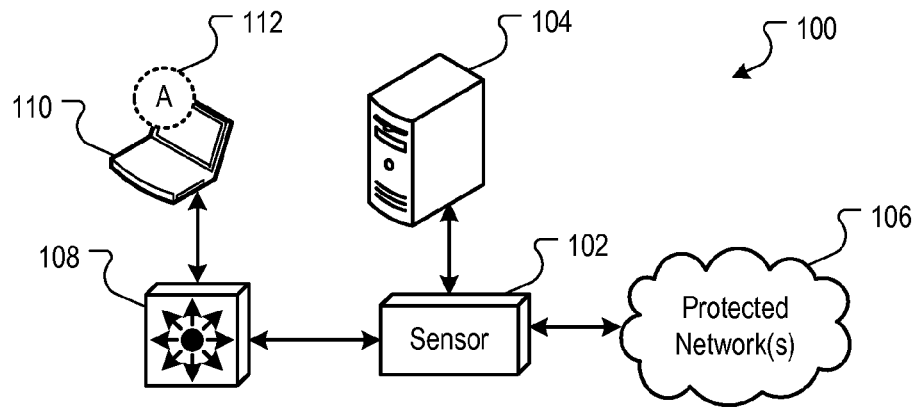
FIG. 1 is a block diagram of an example deployment architecture of a network access control system.

A network access control system protects a network by identifying, assessing, quarantining, and remediating host devices prior to network access, and during network access. The network access control system includes network sensors that are deployed on the edge of a protected network or within the network, and one or more network access control servers in data communication with the network sensors.

As used herein, a sensor device, also referred to as a sensor, is a hardware device in a data communication path between a host device joining a network and the network resources that the host devices are attempting to access. An example sensor device includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query the network access control server and take further actions as instructed by the network access control server.

The network access control server is one or more server computers, each of which include one or more processors, a memory subsystem, and an input/output subsystem. The network access control servers are programmed to communicate with the sensors and to determine actions to be taken based on the user that is logged onto the host device and the health level of the host device, to provide configuration data to the sensor devices and updates to the sensor devices, and to query identity databases, such as an LDAP database. These functions can be distributed among different servers running different software components, or can be consolidated in a single server.

In some implementations, network access zones that define network access capabilities for the host device can be employed, allowing different access capabilities for host devices. The access capabilities of a network access zone can depend upon the system health of the host device, the user identity of the user login using the host device, and other factors, such as whether the user has logged in through a virtual private network (VPN).

In some implementations, such as those described in the deployment architectures 100 and 200 of FIGS. 1 and 2 below, a software agent of the network access control system can be installed on the host device to assess the health of the host device. As used herein, the health of host device, or health level of the host, refers to the configuration of the host with respect to a specification defining a minimum set of up-to-date security software in the host device. Depending on the differences between the configuration of the host device and this specification, the agent, or another process that receives data from the agent specifying the host device configuration, can classify the hosts into one of several health level categories. In some implementations, the health level category can be a binary category, such as healthy and unhealthy, or can have several levels of categories, such as healthy, fair, poor, serious, and critical. Finally, if the health level of the host device cannot be determined, the health level of the host device can be classified as unknown, or alternatively, can be classified according to the lowest health level, e.g., failing or critical. Depending upon the health level the host and, optionally, the identity of the user logged into the host, different network access capabilities can be provided to the host device.

The sensors are deployed in line, i.e., directly in the network traffic path, inspecting all traffic as it passes through the sensor. In this mode, packet inspection is performed in real-time, and intrusive or malicious packets are dropped as they occur. Furthermore, in this mode, the sensor can redirect traffic of a host device, or limit traffic of a host device.

§1.1 Layer 2 Deployment

FIG. 1 is a block diagram of an example deployment architecture 100 of a network access control system. This example deployment architecture is referred to as "Layer 2" or "L2" mode. The sensor 102 is connected to a host device 110 through a Layer 2 switch device 108. In this mode, the sensor 102 identifies a host device based on its MAC address, and collects information from a host device 110 by use of a network access agent 112. When the host device 110 attempts to connect to the network 106, the sensor 102 sends an information probe to the agent 112. The information probe is an agent query, and in response to the information probe, the agent 112 provides an agent identifier of the agent, the MAC address of the host device 110, user login information associated with the host device 110, and other information, such as data indicating a health level of the host device 110. In some implementations, the agent identifier is a unique identifier, i.e., each agent used by the network access control system has a unique identifier that is not used by other agents.

The sensor 102 is also in communication with a network access control server 104. As described above, the network access control server 104 is programmed to communicate with the sensors and to determine actions to be taken based on the user that is logged onto the host device and the health level of the host device, to provide configuration data to the sensor devices and updates to the sensor devices, and to query identity databases, such as an LDAP database. These functions can be also be distributed among two or more servers; however, to avoid congestion in the drawings, a single server 104 is shown.

Together the sensor 102 and the network access control server 104 provide protection and access control for one or more protected networks 106. Examples of such protected networks include corporate local area networks (LANs), corporate wide area networks (WANs), and other networks for which access to the network can be controlled.

§1.2 Layer 3 Deployment

Figure 2:
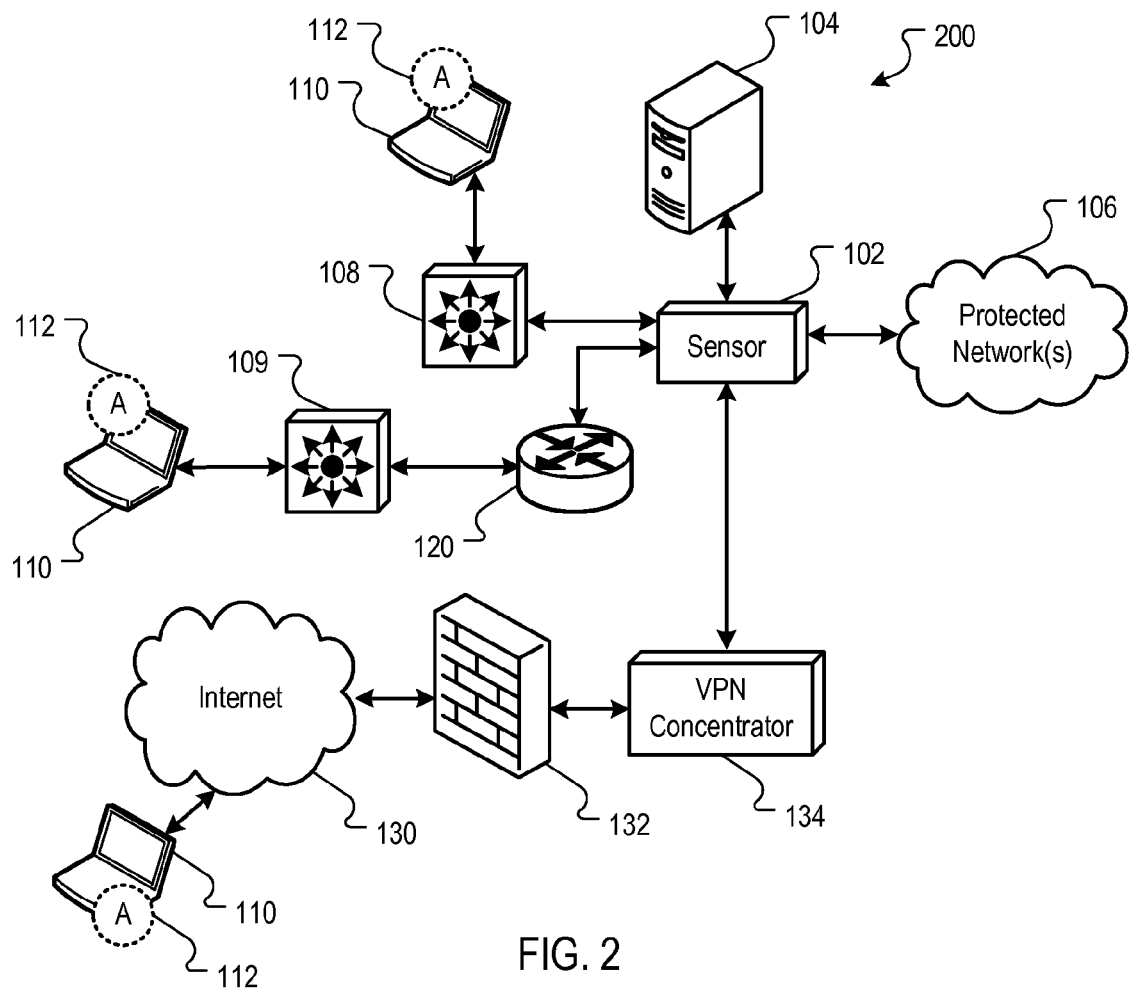
FIG. 2 is a block diagram of another example deployment architecture of a network access control system.

FIG. 2 is a block diagram of another example deployment architecture 200 of a network access control system. This example network architecture is referred to as a "Layer 3" or "L3" deployment mode. In this mode, the sensor 102 detects a host device based on the IP address of the host device. In this mode, host devices 110 can connect to the sensor by use of a Layer 2 switch 108, or a Layer 3 switch 109 and the router 120. Additionally, host devices 110 can also connect to the sensor 102 through a virtual private network. For example, a host device 110 can connect to the sensor 102 through the Internet 130 and a VPN concentrator 134. In this mode, layer 2 devices are also detected by their IP addresses, i.e., layer 2 devices are treated as layer 3 devices.

Because this mode is at the network layer, the sensor 102 can use additional information probes to collect information from host devices 110. For example, in addition to an agent query, the sensor 102 can also use NBTSTAT queries to collect information from a host. Additionally, the sensor 102 can use ICMP pings to determine if a host device is on-line or off-line.

Note, however, that the sensor 102 may not be able to use all of these information probes for all host devices 110, depending on the communication path in the session established for each host device 110. For example, a firewall 132 may interfere with one or more probe types.

Other deployments can also be used. For example, the sensor 102 can be configured to use both layer 2 and layer 3 detection modes. In this mode, the deployment architecture is similar to that of FIG. 2. MAC addresses and layer 3 devices, e.g., a router or firewall, are specified in the layer 3 device list. Traffic that has any the MAC addresses specified in the layer 3 device list is treated as coming from a remote network, and the layer 3 detection mode is used. Conversely, traffic that does not have any of the MAC addresses specified in the layer 3 device list is treated as coming from a local network. In this case, the layer 2 detection modes used.

§1.3 Health-Based Network Access Control

Figure 3:
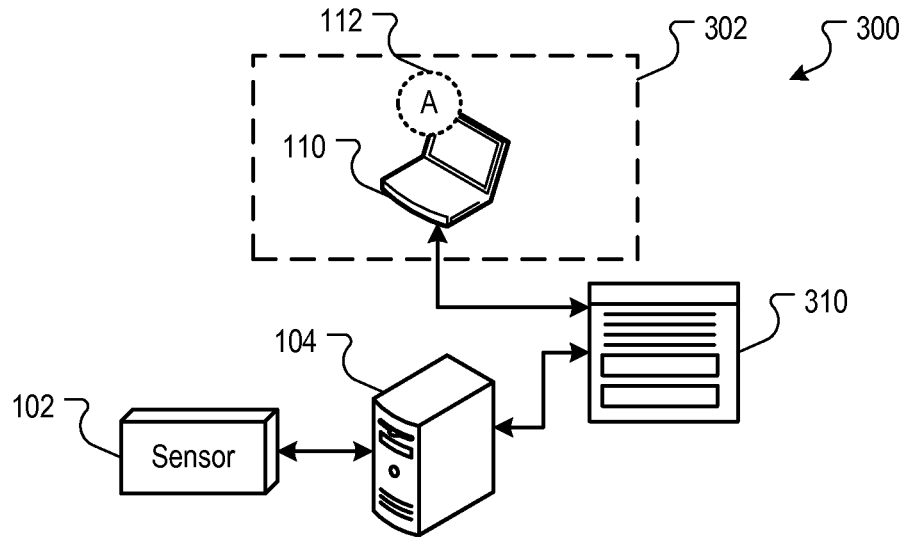
FIG. 3 is a block diagram illustrating a system health based network access control process.

FIG. 3 is a block diagram illustrating a system health based network access control process 300. The sensor 102 detects a new host 110 joining the network, and the new host 110 is moved to a preadmission zone 302. In a preadmission zone, the network access control system determines the health level of the host device. Network access given to the host device is limited to critical systems such as login portals and remediation portals, which are described in more detail below.

The sensor 102 queries the agent 112 on the host device 110. The agent 112, in turn, provides data to the sensor 102 for use in determining the health level of the host device 110. If the host device 110 has an agent 112 installed, the host device is considered a managed host device. Conversely, if the host device 110 does not have an agent 112 installed, it is considered an unmanaged host device. In some implementations, unmanaged hosts are redirected to a remediation portal 310 to download an agent 112. When the agent 112 is installed, the health level of the host 110 is determined and communicated back to the network access control server 104 and the sensor 102.

Once the health level of the host device 110 is determined, the sensor 102 maps the host device 110 to a network access zone. The particular network access zone can, for example, be dependent upon the health level of the host device 110. The sensor 102 then allows or drops traffic to and from the host device 110 given the network access zone assigned to the host device 110.

§1.4 Identity-Based Network Access Control

Figure 4:
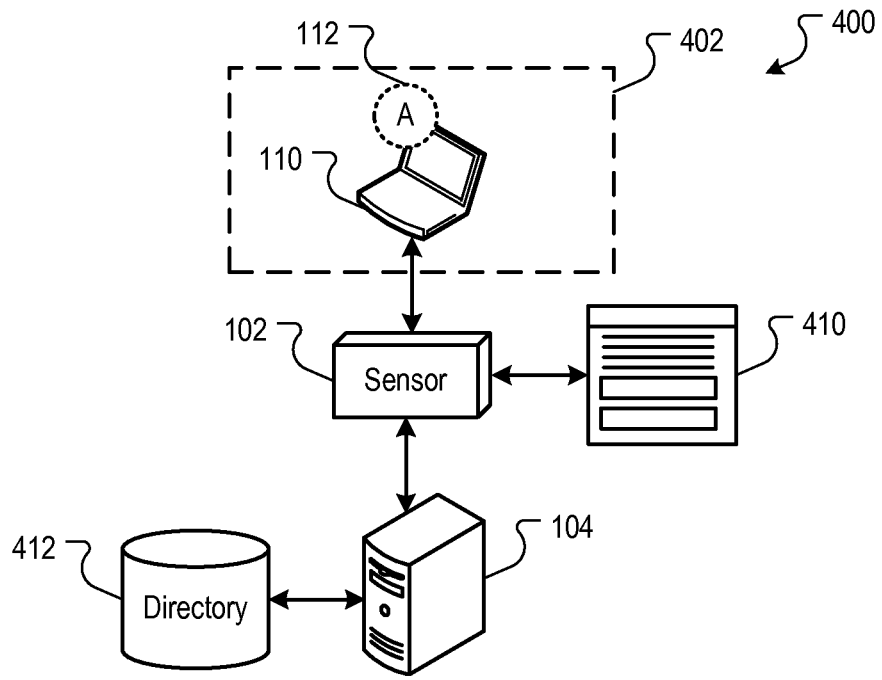
FIG. 4 is a block diagram illustrating an identity based network access control process.

FIG. 4 is a block diagram illustrating an identity based network access control process 400. The sensor detects a new host device 110 joining the network, and places the new host device in the preadmission zone until a user of the host device 110 is authenticated. In some implementations, the identity of the user can be implicitly authenticated, such as by sending a query to the agent 112, snooping traffic of the host device 110, by listening to beacons transmitted from the agent 112, or by examining VPN session data, such as capital RADIUS accounting messages. If the user identity cannot be authenticated implicitly, the sensor 102 redirects the host device to a client guest portal 410, where the user is prompted to submit login credentials for authentication.

Example user data and host information that the sensor 102 obtains can include the following: a user identifier, which is an identifier that is uniquely associated with a user; a source IP address, a MAC address, or a VLAN address, depending upon how the user is connected to the network; and whether the host device 110 is a managed host or an unmanaged host.

Once the identity of the user is obtained, the user attributes and values are compared to attributes and values stored in a predefined directory, such as an LDAP database 412, e.g., implemented in an active directory server. Assuming the user is authenticated, identity-based policies are applied to the host device when the user is logged in. For example, user identifiers are mapped to a user role associated with a corresponding network access zone, e.g., host devices 110 of users that are mapped to the role of network administrators may have applied to them a network access zone in which all network access capabilities are available. Conversely, host devices of users that are mapped to the role of salespersons may have applied to them a network access zone in which network access capabilities are restricted to certain parts of the network.

§2.0 Host Information Collection

As described above, the sensor 102 and the network access control server 104 control the network access of a host device that joins the network The access control is based on either the identity of the user who has logged on to that host device, the health of the host device, or both. Additionally, once the host device 110 is provided access to the network, the host device must be monitored for going offline, for IP address reassignments (e.g., the IP address being re-used by a different host device) and for other events or actions that may change the status of the host device.

The sensor 102 determines the identity and other critical information (e.g., a MAC address) describing the host device to facilitate implementing network access control. This is established during a "host information collection phase." In some implementations, the detection of a host device 102 is declared to the network access control server after completion of the host information collection phase.

Figure 5:
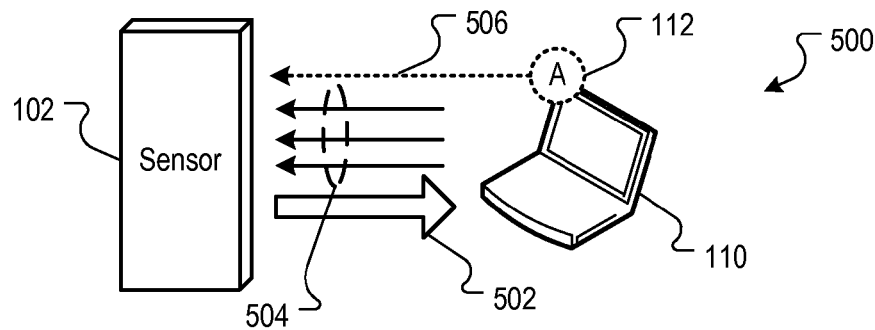
FIG. 5 is a block diagram illustrating a host information collection phase in the network access control system.

FIG. 5 is a block diagram illustrating a host information collection phase 500 in the network access control system. As described above, the sensor 102 collects information from a host device 102 by way of information probes 502 and listening for replies 504 to the information probes 502. Additionally, if an agent 112 is installed on a host device 110, the sensors 102 can listen for an agent beacon 506.

The types of information probes can vary based on the system architecture, operating system environment, and communication protocols supported. In some implementations, the sensor 102 can send an agent probe, an NBSTAT query, and an ICMP Ping. A response to the agent probe from the agent 112 provides the most detailed information about the host device 110. For example, in some implementations, the reply can provide the agent identifier, the MAC address, information about the user that is logged into the host device 110, the host name, and the network domain name. Additional information, such as health level information, can also be provide.

The agent beacon 506, in some implementations, also provides the same information as a reply to the agent probe. In other implementations, the agent beacon 506 can provide a proper subset of the information, such as the agent identifier and the MAC address.

The sensor 102 can also use an NBTSTAT query to request the MAC address and the host name of the host device 110. The ICMP ping is a probe that only provides the sensor 102 with confirmation that the host device is reachable over an IP network.

Due to various factors in the network, e.g., the firewall 132 not allowing agent queries, some of the information probes may not result in the sensor 102 collecting host device information, despite the host device 110 being capable of replying to these probes. To efficiently collect information, a host information collection algorithm is implemented in the sensor 102. Briefly, the sensor 102, when implementing the host information collection algorithm, begins a host information collection phase and sends all the probes to the host device 110 in response to detection of the host device 110 attempting to join the network.

If an identifier is obtained from a reply to the agent query the host info collection phase ends immediately. Conversely, if an agent identifier is not received after a timeout period (e.g., 30 seconds, 1 minute, 5 minutes, or some other time period), all information probes that have not been responded to are resent. If, after a maximum number of retries, e.g., 3, the agent identifier is not provided to the sensor 102, the host info collection phase ends.

In some implementations, if an agent identifier is received from an agent beacon, the host information can also end immediately. For example, if the agent beacon sends the same information as a reply to the agent query, the agent beacon can be used to process the same information that is provided by the reply to the agent query.

Figure 6:
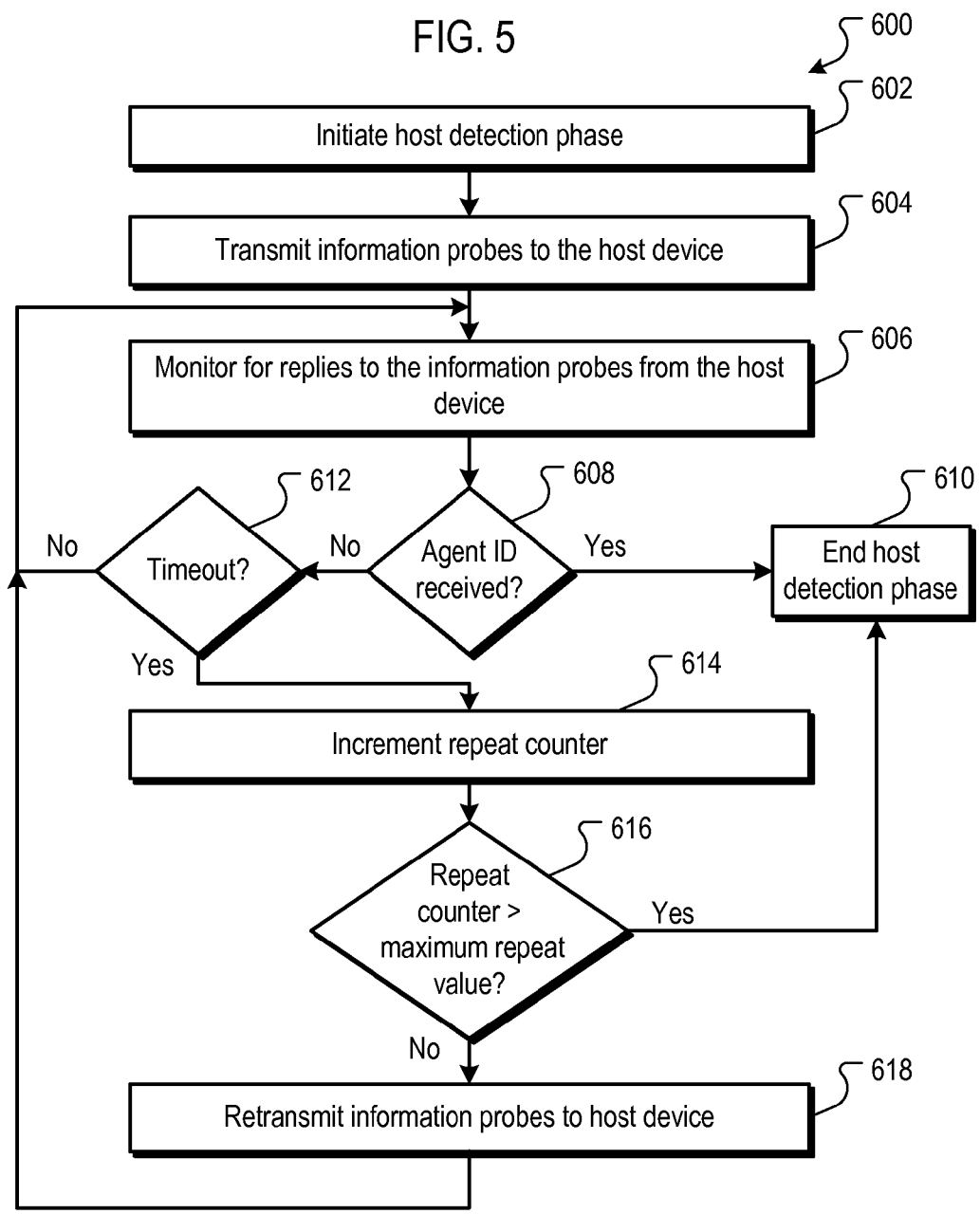
FIG. 6 is a flow diagram of an example process of collecting host information from a plurality of information probes.

FIG. 6 is a flow diagram of an example process 600 of collecting host information from a plurality of information probes. The process 600 can be implemented in the sensor 102.

The process 600 initiates a host detection phase (602). For example, in response to detecting a host device 110 attempting to join the network, the sensor 102 can initiate the host detection phase.

The process 600 transmits information probes to the host device (604). For example, the sensor 102 can transmit an agent query, and NBTSTAT query, and an ICMP ping to the host device 110.

The process 600 monitors for replies the information probes from the host device (606). For example, the sensor 102 listens for responses to the information probes. Additionally, the sensor 102 can also listen for agent beacons. If an agent 112 is installed on the host device 110, the agent will periodically send an agent beacon.

While monitoring, the process 600 determines if an agent identifier has been received (608). For example, the sensor 102 will determine if it has received a reply to an agent query, or if it has received an agent beacon, and if so, if the reply or the beacon include the agent identifier.

If an agent identifier is received, the process 600 ends the host detection phase (610). For example, the sensor 102 will notify the network access control server 104 of a new host device 110 joining network, and will initiate further network access control processing to join the host device 110 to the network (or preclude the host device 110 from joining the network, if necessary).

If, however, the agent identifier has not been received, then the process 600 determines if the timeout has occurred (612). For example, the sensor 102 will determine if a predefined time period, measured from when the information probes were sent, has expired.

If a timeout has not occurred, the process 600 returns to monitoring for replies (606); conversely, if a timeout has occurred, the process 600 increments a repeat counter (614) and determines if the repeat counter is greater than the maximum repeat value (616). For example, the sensor 102 can increment a repeat counter in memory and compare the value of the repeat counter to a maximum repeat value.

If the repeat counter is greater than the maximum repeat value, the process ends the host detection phase (610). For example, sensor 102 will end the host detection phase if the repeat counter exceeds the maximum repeat value. Depending on the information received from the host device 110, the sensor 102 can initiate further network access control processing to join the host device 110 to the network, providing only limited network access to the host device, or preclude the host device from joining the network. For example, if the host device 110 does not have an agent 112 installed, the host device may be redirected to client portal to install an agent 112. Optionally, the host device 110 may be redirected to a guest access portal to allow the user to provide user credentials to gain access to the network, or portion of a network.

Conversely, if the repeat counter is not greater than the maximum repeat value, then the process 600 retransmits information probes to the host device (618), and returns to monitoring for replies (606).

§3.0 Host State Machine

As the host device 110 connects to the network, it goes through a series of health assessments and/or identity authentications before it is allowed to join the network. Additionally, the host device 110 has a network access zone applied, depending on the health of the host device 110 and the identity of the user of the host device. As described above, when the identity of the user cannot be established implicitly, or when the system health can not be determined, traffic for the host device 110 is redirected to a guest portal 410 or a remediation portal 310, respectively. Once the identity is established through the guest portal 410 and/or the system health is established through the remediation portal 310, the sensor 102 will provide the host device 110 with the appropriate network access.

The phase where the identity and/or the system health are determined is referred to as a "preadmission" phase. The phase where network access is provided to the host device 110 is referred to as a "post admission" phase. While in the post admission phase, the host can go back to the preadmission phase based on a change in health, a change in user identity, an IP address reassignment, or by going off-line and attempting to rejoin the network. Furthermore, in each of the preadmission and post admission phases, different states occur. For example, during preadmission, the host device 110 goes through a host information collection phase, and may need to go through a login phase or a remediation phase. The choice of subsequent phases is dependent on the current state of the host device 110, the health level of the host device 110, and the identity of the user of the host 110 (if identify-based network access control is being used).

Thus, to effectively maintain an entry for the host device 110 in the sensor and take appropriate actions on the traffic from the host device 110, i.e., redirecting or dropping traffic, the sensor 102 needs to know the current state of the host device 110. Accordingly, each sensor device 102 implements, in memory, a state machine that includes a plurality of states and for which network access for the host device 110 is controlled in each state according to one or more network access zones associated with the state.

Figure 7:
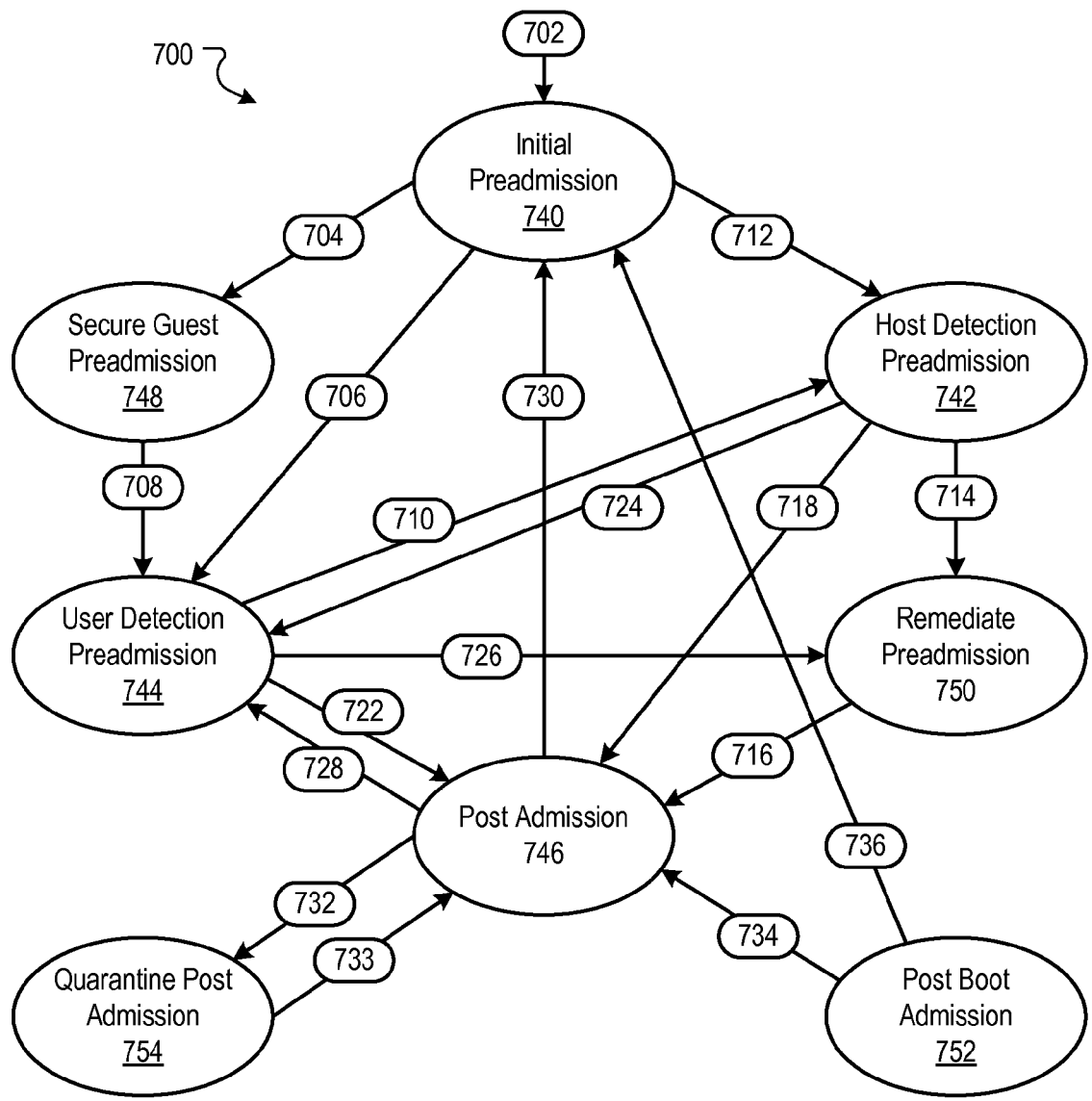
FIG. 7 is a state diagram for a host state machine that is used to control network access of the host device.

FIG. 7 is a state diagram for a host state machine 700 that is used to control network access of the host device. Each large oval represents a state in which a host device 110 may be transitioned to, and each arrow represents a transition from one state to another state. Each transition condition is numbered on its respective arrow and described below.

The sensor 102 monitors each host device 110 for which it is responsible and transitions each host device to a state based on the monitoring and a current state of the host device. In some implementations, these states are recorded in a host table that stores data for each host device 110 being monitored by the sensor 102. By monitoring host attributes of the host device that identify the host device, traffic to and from the host device, and the state of the host device, the sensor 102 can control network access of the host device according to the one or more network access zones associated with the state of the host device.

In the description that follows, each state and the actions that are taken during each state are described. Thereafter, the transitions from states are described, as are the transition conditions that cause the transitions.

§3.1 States

In some implementations, the states include an initial preadmission admission state 740, a host detection preadmission state 742, a user detection preadmission state 744, a post admission state 746, a secure guest preadmission state 748, a remediate preadmission state 750, a post boot admission state 752, and a quarantine post admission state 754. Additional states can be implemented, or, alternatively, fewer states can be implemented, depending on the network access control solution desired. For example, if network access control is based solely on the health level of a host device 110, then the secure guest preadmission state 748 and the user detection preadmission state 744 can be omitted, as these states are transitioned to when an identity-based network access control solution is employed.

The initial preadmission state 740 is a state during which the sensor 102 sends host information collection queries to the host device to receive host attributes from the host device in response. In some implementations, the host device is quarantined and a preadmission network access zone that prevents redirection of host device traffic is applied. The sensor 102 sends information probes to the host device 110 in an attempt to identify the host device 102.

The host detection preadmission state 742 is a state during which the sensor 102 determines a host status based on the host attributes of the host. In this state, the sensor 102 sends a host detection event message to the network access control server 104, and, in some implementations, the preadmission network access zone still applies.

The user detection preadmission state 744 is a state during which a user identifier associated with the host device is mapped to a user role associated with a corresponding network access zone. In this state, the sensor 102 has determined a user identifier for the host device 110, and a user detection event is sent to the network access control server 104 to map the user identifier to a specific role defined for the user identifier. In some implementations, the preadmission network access zone still applies in this state.

The post admission state 746 is a state during which the host device is granted access to the network according to one of a plurality of network access zones. In this state, the host device 110 has been granted network access in accordance with the network access zone that is dependent on the health level of host device 110. In some implementations, the network access zone dependent on health level the host device 110 is applied only if the host device 110 was an unmanaged host, i.e., a host device 110 that did not have an agent 112 installed when it initially attempted to join the network.

In some implementations, if identity-based network access control is not enabled, and if the host device 110 is a managed host device, then full network access is provided.

During the post admission state 746, the sensor 102 monitors the host to determine if it remains online, and to detect possible IP address reassignments. Other events can also be monitored, such as a user logging out of the host device 110, and a new user logging into the host device 110.

The secure guest preadmission state 748 is a state during which HTTP traffic from the host device is directed to a guest access portal managed by the sensor 102 and which causes the host device to generate a user login and password prompt and. The sensor receives a user identifier and password in response to user input. In this state, traffic from the host device 110 is redirected to a secure guest access portal 410. The user is prompted for a login name and password credentials. Upon receiving these login credentials, the sensor 102 passes the login credentials to the network access control server 104, and the network access control server 104 authenticates or rejects the login.

The remediate preadmission state 750 is a state during which HTTP traffic from the host device is directed to a remediate portal managed by the sensor 102 and which causes an agent to be downloaded to the host device. Only unmanaged host devices 110 are transition to this state. Traffic for the host device 110 is redirected to a remediation portal 310 and an agent is downloaded onto the host device 110. When the agent 112 is installed, the health level of the host device 110 is determined and communicated to the network access control server 104 and the sensor 102. In some implementations, the preadmission network access zone applies.

The post boot admission state 752 is a state in which all host devices are in after a sensor 102 reboot. The host attributes of all hosts stored in a persistent memory prior to a reboot of the sensor 102 are copied into a host table after the sensor 102 reboot, and the sensor 102 sends information probes to determine if one or more attributes of each host device 110 has changed. For example, prior to a reboot, the states of the host devices 110 and the host table have been persisted to a persistent memory, such as a flash memory.

Upon reboot, information probes are sent to the host devices 110 to determine if IP addresses have been reassigned. Depending on the response to these information probes, a host device 110 may go into the post admission state 746, or may revert to the initial preadmission state 740.

The quarantine post admission state 754 is a state during which network access for the host is limited to a quarantine zone. In this state, access is restricted to a quarantine network access zone. Network access capabilities available to the host device 110 can, for example, be based on the severity of the attack that caused the transition to the state. The host device 110 remains in the state until a message is received from the network access control server 104 informing the sensor 102 of the change in the health level of the host device. In some implementations, the host device 110 can remain in this state until a quarantine period timeout occurs.

§3.2 Transition Events

When a sensor 102 detects a new host device 110 attempting to join the network, the sensor populates its host table with a record for the host device 110 and initially places the host device in an unknown state. For example, the sensor 102 can receive a packet from a host device 110 for which there is no entry in the host table. Alternatively, for a host device 110 attempting to join a VPN, a RADIUS "accounting start" message can also create a host entry in the host table. The condition 702 of a host device 110 being listed in the host table with an unknown state causes the host device to transition to the initial preadmission state 740.

The state of the host device 110 can also transition to the initial preadmission state 740 from the post admission state 746 upon an IP address being reassigned to the host device 110, an information probes failing to receive a response after a maximum number of retries, or a RADIUS "accounting stop" message being received for the host device 110 (condition 730).

The state of the host device 110 can also transition to the preadmission state 740 from the post boot admission state 752 in response to one or more of the host attributes in an information probe reply received by the sensor 102 not matching the attributes of the host device 110 as stored in the host table (condition 736).

The state of the host device 110 can transition to the user detection preadmission state 744 from the secure guest preadmission state 748 when the user identifier is determined. For example, if identity-based network access control is enabled, the user identifier can be determined implicitly, as described above, or explicitly by use of the guest access portal 410 (condition 708).

The state of the host device 110 can transition to the user detection preadmission state 744 from the host detection preadmission state 742 when an identity-based access control process is enabled for the host device and a user identifier for the host device has been determined. For example, when the network access control server 104 returns the identity of the user of the host device 110, the state of the host device 110 can transition from the host detection preadmission state 742 to the user detection preadmission state 744 (condition 724).

The state of the host device 110 can transition to the user detection preadmission state 744 from the initial preadmission state 740 when an identity-based access control process is enabled for the host device and a user identifier for the host device has been determined. For example, the sensor 102 and/or the network access control server 104 can determine the user identifier for the host device 110 by parsing host device traffic capturing the user identifier information, e.g., by processing RADIUS AUTH packets, by agent queries sent to the host device 110, or by listening to agent beacons sent from the host device 110 (condition 706).

The state of the host device 110 can transition to the user detection preadmission state 744 from the post admission state 746 when a user logout of the host device is detected. For example, the user logout can be detected by the sensor 102, the network access control server 104, by a response to an agent query, or by listening to an agent beacon (condition 728).

The state of the host device 110 can transition to the secure guest preadmission state 748 from the initial preadmission state 740 when an identity based network access-control process for the host device is enabled and the host attributes received for the host device indicate that the host device is not a member of a predefined directory, or a user identifier for the host is not determined from the received host attributes. For example, a reply to an agent query with may indicate that the user identifier of the host device 110 is not a member of an active directory domain, or the host information collection phase fails to determine a user identifier for the host device 110 (condition 704).

The state of the host device can transition from the initial preadmission state 740 to the host detection preadmission state 742 when the identity-based access control process is enabled for the host device and host attributes of the host are not received in response to host information collection queries (e.g., an agent query timeout), or a MAC address is received in a data link layer (L2) detection mode (condition 712).

The state of the host device can transition from the user detection preadmission state 744 to the host detection preadmission state 742 when the user identifier is mapped to a user role and further network accesses control for the user role is enabled (condition 710). For example, a particular user role for which the health level of the host device 110 must be determined can cause a transition from the user detection preadmission state 744 to the host detection preadmission state 742.

The state of the host device can transition from the host detection preadmission state 742 to the remediate preadmission state 750 when the host is determined to be an unmanaged host with an unknown health level (condition 714). For example, the sensor 102, or the network access control server 104, can determine that the host is unmanaged and has an unknown health level based on the absence of an agent 112 being installed on the host device 110.

To state the host device can transition from the user detection preadmission state 744 to the remediate preadmission state 750 when the user identifier is mapped to a user role associated with a corresponding network access zone and further network accesses control for this role is enabled (condition 726). For example, the user may be authenticated through the user detection preadmission state 744, and the role of the user (e.g., a guest) requires that the health level of the host device 110 be determined.

The state of the host device can transition from the host detection preadmission state 742 to the post admission state 746 when the host is determined to be a managed host or the host is determined to be an unmanaged host with a predetermined health level that is acceptable for transition to the post admission state (condition 718).

The state of the host device can transition from the remediate preadmission state 750 to the post admission state 746 when the host device 110 is determined, from the health data provided by the agent, to have a health level that is acceptable for transition to the post admission state (condition 716).

The state of the host device can transition from the user detection preadmission state 744 to the post admission state 746 when the user identifier is mapped to a user role associated with a corresponding network access zone and further network accesses control for this role is disabled (condition 722).

The state of the host device can transition from the post boot admission state 752 to the post admission state 746 when the host attributes of the host device received after the reboot match the host attributes of the host device stored in the persistent memory and copied into the host table (condition 734). For example, the sensor 102 or the network access control server 104 can determine that host attributes, such as the agent identifier, user identifier, IP address and MAC address, received in information probe replies match the attributes in a record in a host table for the host device 110. Thus, if the state of the host has not changed since prior to the reboot, the host device state is transitioned to the post admission state 746.

The state of the host device can transition from the post admission state 746 to the quarantine post admission state 754 when an attack is detected for the host device 110 (condition 732). For example, the sensor 102 can detect an attack from monitoring the network traffic of the host device 110, or the agent 112 can notify the sensor 102 of attack. Attacks can be detected by monitoring the behavior of the host device, and/or by comparing the traffic to and from the host device 110 to malware and/or virus signature data.

The state of the host device can transition from the quarantine post admission state 754 to the post admission state 746 until the sensor 102 receives a message from the network access control server 104 informing the sensor 102 of a change in the health level the host device 100, or, optionally, until a quarantine period timeout occurs (condition 733).

§4.0 Failover Configuration

Figure 8:
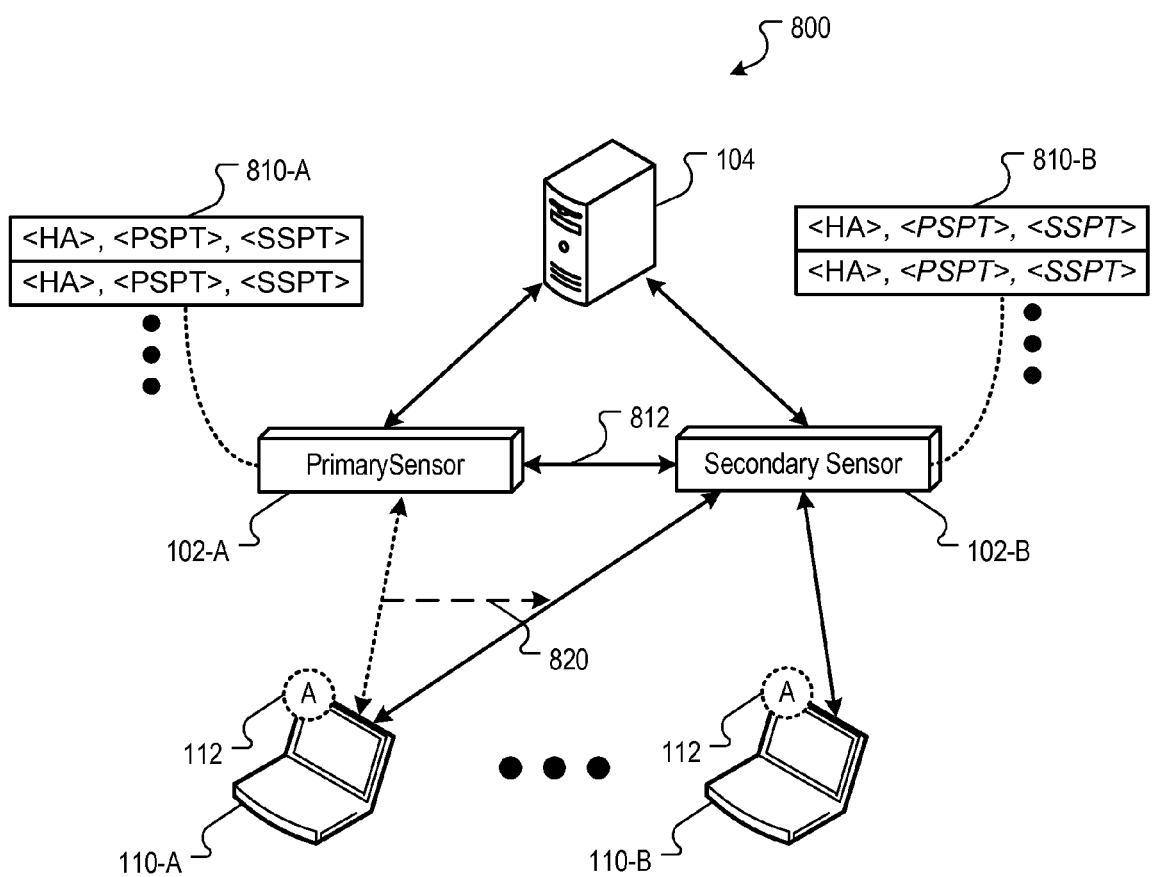
FIG. 8 is a block diagram of two sensors configured in a failover configuration.

In some implementations, the sensors 102 can be deployed in a failover configuration. FIG. 8 is a block diagram of two sensors 102-A and 102-B configured in an example failover configuration 800. In this configuration, one sensor is designated a primary sensor (102-A), and the other sensor is designated a secondary sensor (102-B). As will be explained below, either the primary sensor 102-A or the secondary sensor 102-B is responsible for probing a host device 110.

As depicted in FIG. 8, the primary sensor 102-A is responsible for probing the host device 110-A, and the secondary sensor is initially responsible for probing the host device 110-B. Together the sensors 102-A and 102-B form a pair of peer sensors configured to control host device 110 access to a network.

Each sensor 102 stores a host table 810 that includes, for each of the host devices 110 monitored on the network by the peer sensors, a record including fields for host attributes ("HA"), a primary sensor probe type ("PSPT") and a secondary sensor probe type ("SSPT"). As will be explained in more detail in section 4.2 below, the primary and secondary probe types are the probe types of the highest priority information probe for which a reply from the host device was received at the primary sensor and the secondary sensor, respectively.

Example host attributes include an IP address of the host device 110, a MAC address of the host device 110, an agent identifier of an agent 112 installed on the host device 110, a user identifier of a user logged into the host device 110, and one or more timestamp fields for storing a timestamp indicating the time that the host attributes were stored the record.

§4.1 Host Table Synchronization

When in a failover configuration, the host tables 810 in the sensors 102 are synchronized so that they are identical (except for the time stamps). In normal operations, the sensors are connected through a interconnect link 812 to maintain synchronization of the host tables 810. However, when a peer sensor 102 in a failover configuration goes offline, or if the interconnect link 812 goes down, the host tables stored in both sensors need to be synchronized upon recovery of the interconnect link 812, or upon the peer sensor 102 coming back online.

In some implementations, each record includes a separate timestamp for each of a user identifier attribute, a MAC address attribute, an agent identifier attribute, and a host name attribute. Each timestamp measure the time that the record was last updated for its respective attribute. In other implementations, each record includes only one timestamp that measure when the record was last updated for any attribute.

In some implementations, the timestamps are based on unsynchronized system clocks. Unsynchronized system clocks are clocks that are not synchronized to a reference time, such as GMT, or synchronized to each of the other sensor clocks. As the time stamps for records cannot be compared in absolute values, they are compared relative to the time they were entered in the host tables 110 to determine which record in the tables is most recent. For example, if one record in host table 810-A for host device 110-A was updated 10 minutes ago, relative to the system clock of the sensor 102-A, and a corresponding record in host table 110-B for the host device 110-A was updated one minute ago, relative to the system clock of the sensor 102-B, the latter is determined to be the most recent record.

In some implementations, when the record is transmitted to a peer sensor, the timestamp field of the data being transmitted is updated based on the following calculation:

$$\text{system clock time} - \text{last update time}$$

For example, assume the MAC address field in a first peer sensor memory was updated at a system clock time of 1000, and that the record is provided to a second peer sensor at a system clock time of 1100 in the first peer sensor. For the record data transmitted to the second peer sensor, the timestamp of the MAC address is 100 (1100−1000).

Alternatively, the receiving sensor 102 can communicate with its peer sensor over the link 812 to obtain the peer sensor's clock value to determine how long ago the peer record was updated. Likewise, the receiving sensor can compare its own clock value to the timestamp of the record in its own host table to determine how long ago the record in its own host table was updated.

In other implementations, the timestamps can be synchronized, i.e., the clocks for all sensors can be synchronized to each other to a known reference time, e.g., Greenwich mean time (GMT). In these implementations, the timestamp that is most recent is the most current.

In some implementations, the IP address of the host entries are used as a key to synchronize the host tables 810. To synchronize, the timestamps are used to determine when the Agent identifier, MAC address, user information, and other host attributes were updated, as well as the probe type that was used to collect the information that resulted in the most recent update.

For example, during synchronization, a sensor, e.g., 102-A, receives a peer record for a host entry from its peer sensor, e.g., 102-B. Assume the peer record from host table 810-B corresponds to the host device 110-B, and that the sensor 102-A is coming back online. If the peer record identifies is a completely new entry (i.e., there is no entry in the host table 810-A for the IP address listed in the peer record), then subsequent searches are done in the host table 810-A based on the agent identifier and then on the MAC address, if necessary.

If there is an entry in the host table 810-A with the agent identifier that is provided in the peer record, and if the peer record is more recent than the record in the host table 810-A (e.g., for a record with only one time stamp, the time stamp of the peer record indicates that the record was updated more recently in the host table 110-B than the record in the host table 110-A, or, for a record with a separate timestamp for each of the agent identifier, MAC address, user identifier and host name attributes, the time stamp of the peer record indicates the agent identifier is more recent that the agent identifier of the record stored in the host table 810-A), then an IP address reassignment occurred for the host device 110-B. The corresponding record in the host table 810-A is updated, and the network access control server 104 is notified.

If any of the above conditions are not met, however, then the host table 810-A is searched based on the MAC address of the peer record. If there is an entry in the host table 810-A with the MAC that is provided in the peer record, and if the peer record is more recent than the record in the host table 810-A (e.g., for a record with only one time stamp, the time stamp of the peer record indicates that the record was updated more recently in the host table 110-B than the record in the host table 110-A, or, if multiple time stamps are used, the time stamp of the peer record indicates the MAC address is more recent that the MAC address of the record stored in the host table 810-A), then an IP address reassignment occurred for the host device 110-B. The corresponding record in the host table 810-A is updated, and the network access control server 104 is notified.

Otherwise, the host device 110-B is a new host device, and a new host detected event with all appropriate information available from the peer record is sent to the network access control server 104.

If the peer host record includes an IP address that is already in the host table 810-A, then the agent identifiers, the MAC addresses, user and host information, and the probe types are compared, if necessary.

For example, if the agent identifier of the host record in the host table 810-A does not match the agent identifier in the peer record, and if the peer record is more recent than the host record in the host table 810-A, then the host device 110-B is a new host using the same IP address that is stored in the host table 810-A. The host record in table 810-A is deleted and a new host device detection event is generated by the sensor 102-A.

If, however, the agent identifiers match, then the MAC addresses are compared. If the MAC addresses differ, and if the peer record is more recent than the host record in the host table 810-A, then the host device 110-B is a new host using the same IP address that is stored in the host table 810-A. The host record in table 810-A is deleted and a new host device detection event is generated by the sensor 102-A.

If the MAC addresses also match, then the user information and host information of the host device 110-B is compared (if identity based network access control is implemented).

If the user information and the host information are different, and if the peer record is more recent than the host record in the host table 810-A, then a new user has logged onto the host device 110-B. The contents of the peer record are copied into the host record in table 810-A, and a new user detection event is generated.

Finally, if the MAC addresses match and identity-based network access control is not implemented, the probe types are compared. If the probe types are different, and if the peer record is more recent than the host record in the host table 810-A, the contents of the peer record are copied into the host record in table 810-A and the probe type of the secondary sensor is uses for subsequent probes.

Figure 9A:
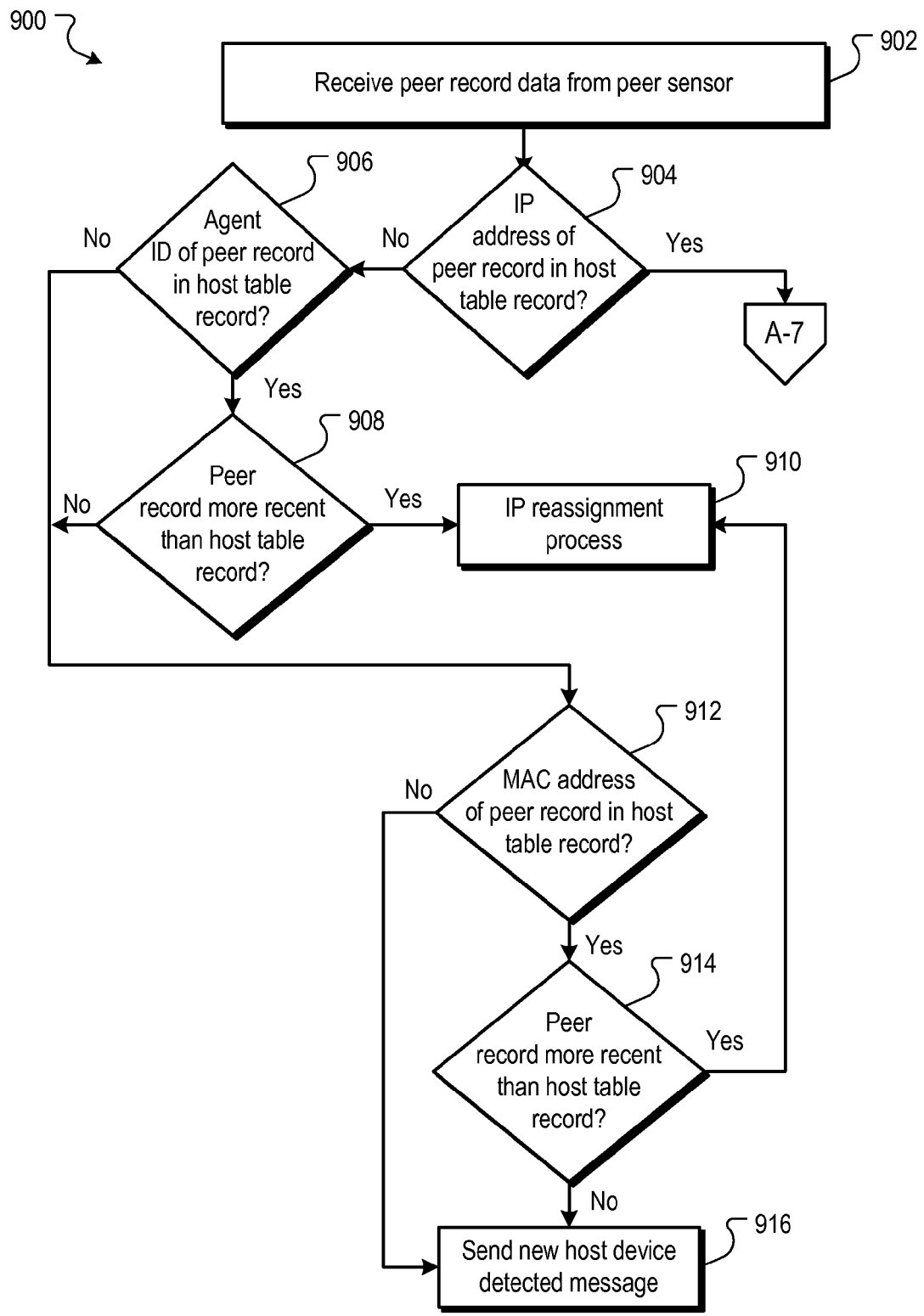
FIGS. 9A and 9B are flow diagrams of an example process for synchronizing host tables in a pair of peer sensors.
Figure 9B:
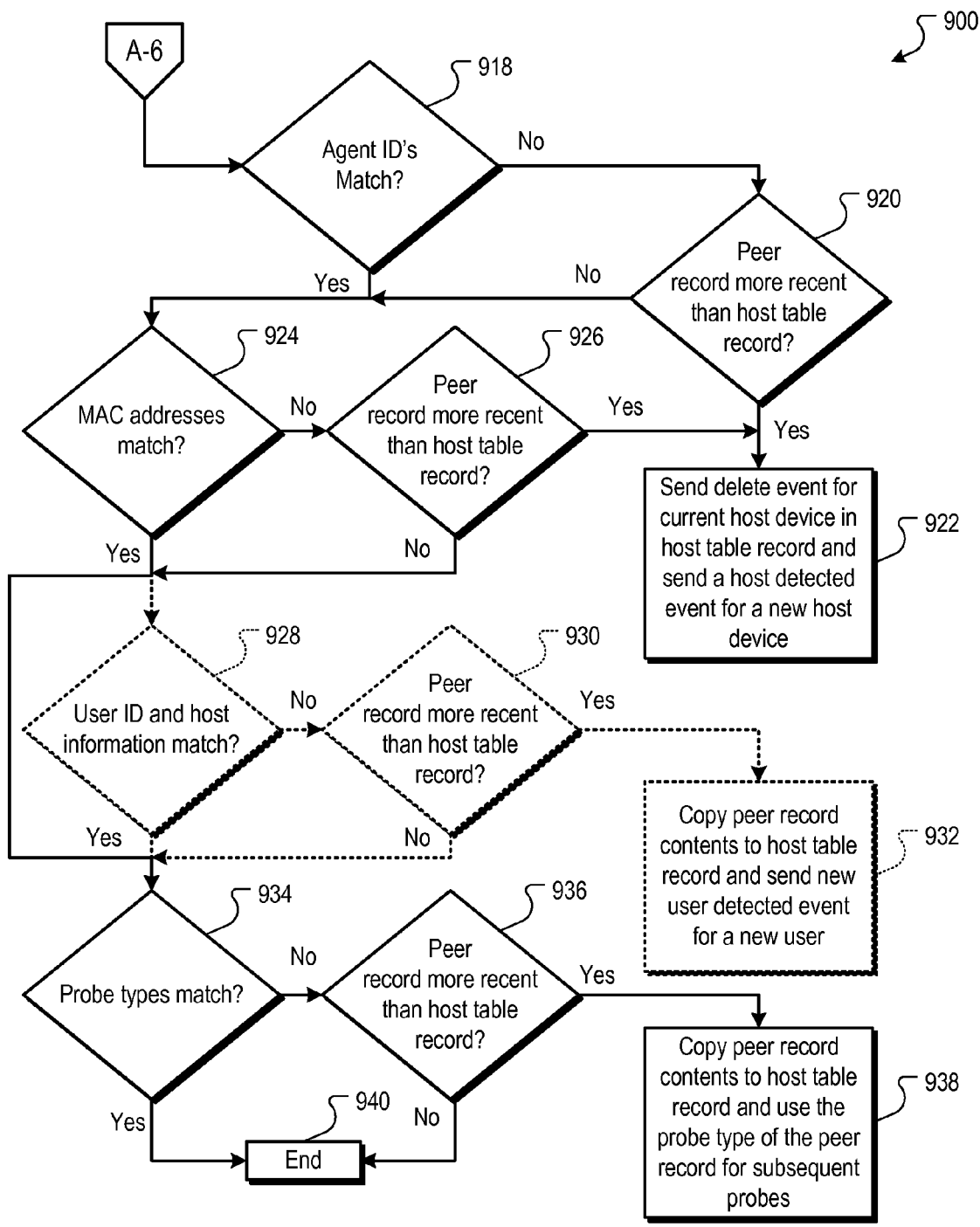

FIGS. 9A and 9B are flow diagrams of an example process 900 for synchronizing host tables in a pair of peer sensors. The process 900 can be implemented in any peer sensor of a pair of sensors 102 configured in a failover configuration. The process steps depicted in FIG. 9A occur when the IP address of the peer record is not stored in the host table of the sensor receiving the peer record, and the process steps depicted in FIG. 9B occur when the IP address of the peer record is stored in a host table record of the host table of the sensor receiving the peer record.

The process 900 receives peer record data from a peer sensor (902). For example, the primary sensor 102-A can receive a record from the secondary sensor 102-B.

The process 900 determines if an IP address of the peer record is stored in a host table record of the host table of the sensor executing the process (904). For example, the primary sensor 102-A searches the host table 810-A based on the IP address in the peer record.

If an IP address of the peer record is not stored in the host table of the sensor executing the process, then the process 900 determines if an agent identifier of the peer record is stored in a host table record of the host table executing the process (906). For example, the sensor 102 can determine if there is an agent identifier stored in the peer record, and if so, can use the agent identifier to search the host table 810-A.

If agent identifier of the peer record is stored in a host table of the sensor executing the process, then the process 900 determines if the peer record is more recent than the host table record (908). For example, the primary sensor 102-A can communicate with the secondary sensor 102-B to obtain the secondary sensor 102-B clock value to determine how long ago the peer record was updated. Likewise, the primary sensor 102-A can compare its own clock value to the timestamp of the record in the host table 810-A to determine how long ago the record in the host table 810-A was updated. Based on these determinations, the primary sensor 102-A determines which of the two records is the most recent.

If the peer record is more recent than the host table record, then the process 900 executes an IP reassignment process (910), as described above. If, however, the peer record is not more recent than the host table record, or if the agent identifier of the peer record is not stored in the host table, then the process 900 determines if the MAC address of the peer record is stored in a host table record of the sensor executing the process (912). For example, the sensor 102 can determine if there is a MAC address stored in the peer record, and if so, can use the MAC address to search the host table 810-A.

If the MAC address of the peer record is stored in the host table the sensor executing the process, the process 900 determines if the peer record is more recent than the host table record (914), as described above.

If the peer record is more recent than the host table record, then the process 900 executes an IP reassignment process (910), as described above. If, however, the peer record is not more recent than the host table record, or the MAC address of the peer record is not stored in the host table, then the process 900 sends a new host device detected message (916). The new host device detected message is sent to the network access control server 104, which, in turn, provides instructions to the sensor 102. Although the network access control server 104 may be aware of the new host device from the monitoring provided by the other peer sensor, the peer sensor that is being updated with the peer record may, in some implementations, need additional direction from the network access control server 104 to determine the correct state of the host device 110 (e.g., receive identification-related information from the network access control server 104, etc.).

Returning to step 904, if the process 900 determines that the IP address of the peer record is stored in the host table, then the process 900 determines if the agent identifier the peer record matches the agent identifier of the host table record in the host table of the peer sensor executing the process (918).

If the agent identifiers do not match, then the process 900 determines if the peer record is more recent than the host table record (920), as described above.

If the peer record is more recent than the host table record, then the process 900 sends a delete event for the current host device in the host table record and sends a host detected event for a new host device (922), as the host device 110-B is a new host device using an IP address that was previously assigned to another host device 110, and for which a reassignment occurred when the primary sensor 102-A was off-line or when the interconnection link 812 was down.

If the peer record is not more recent than the host table record, or if the agent identifiers do match, then the process 900 determines if the MAC address of the peer record matches the MAC address of the host record (924). If the MAC addresses do not match, then the process 900 determines if the peer record is more recent than the host table record (926), as described above.

If the peer record is more recent than the host table record, then the process 900 sends a delete event for the current host device in the host table record and sends a host detected event for a new host device (922), as this again is the case in which the host device 110-B is a new host device using an IP address that was previously assigned to another host device 110.

If the peer record is not more recent than the host table record, or if the MAC addresses do match, and if identity-based network access control is enabled, then the process 900 determines if the user identifier and host information in the peer record match the user identifier host information in the host table record (928).

If the user identifiers and host information do not match, then the process determines if the peer record is more recent than the host table record (930), as described above.

If the peer record is more recent than the host table record, then the process 900 copies the peer record contents to the host table record in the host table, and sends a new user detected event for new user (932), as this is the case in which a new user has logged onto the host device 110-B. In some implementations, only the user identifier and host name information are copied.

If, however, identity-based network access control is not enabled, or if the user identifier and host information do match, or if the peer record is not more recent than the host table record, then the process 900 determines if the probe type of the probe used to collect the information in the peer record matches the probe type of the probe used to collect information in the host table record (934).

If the probe types do not match, then the process 900 determines if the peer record is more recent than the host table record (936), as described above.

If the peer record is more recent than the host table record, then the process 900 copies the peer record contents to the host table record and uses the probe type of the peer record for subsequent probes (938). If, however the peer record is not more recent than the host table record, or if probe types do match, then the process 900 ends (940).

§4.2 Information Probe Allocation

As described above, both of the peer sensors are able to probe the host device with information probes. However, only one of the peer sensors is needed to probe any particular host device at any particular time.

In some cases, when the primary sensor 102-A sends information probes, there may not be any reply from the host device 110; however, if the secondary sensor 102-B sends an information probe, the secondary sensor 102-B can receive a reply to the information probes. This may occur due to network topology differences and changes between the primary sensor, the secondary sensor, and the host device that is monitored by the primary sensor and the secondary sensor, e.g., by the establishment of a firewall, the temporary failure of a switch, etc.

In some implementations, information probing is allocated among peer sensors so that only one peer sensor is responsible for probing a host device. The probing sensor copies the replies received in response to the queries to the non-probing sensor. The initial allocation of the probing sensor among the primary sensor 102-A and the secondary sensor 102-B depends on the replies received to initial information probes at both of sensors. Additionally, whether a host device is determined to be offline in response to a failure to receive a reply to an information probe, and whether to hand over probing responsibilities, depends on the initial probing allocation and the probe types determined by both the primary sensor 102-A and the secondary sensor 102-B.

For example, initial allocation of probing responsibilities between the primary sensor 102-A in the secondary sensor 102-B depends on the information probes that replied to both the primary sensor 102-A in the secondary sensor 102-B. Additionally, whether a host device, such as host device 110-A, is categorized as being off-line in response to failure to receive a reply to an information probe, or whether probing responsibilities are handed over to a peer sensor, can also depend on the information probes that replied to both the primary sensor 102-A in the secondary sensor 102-B.

Figure 10:
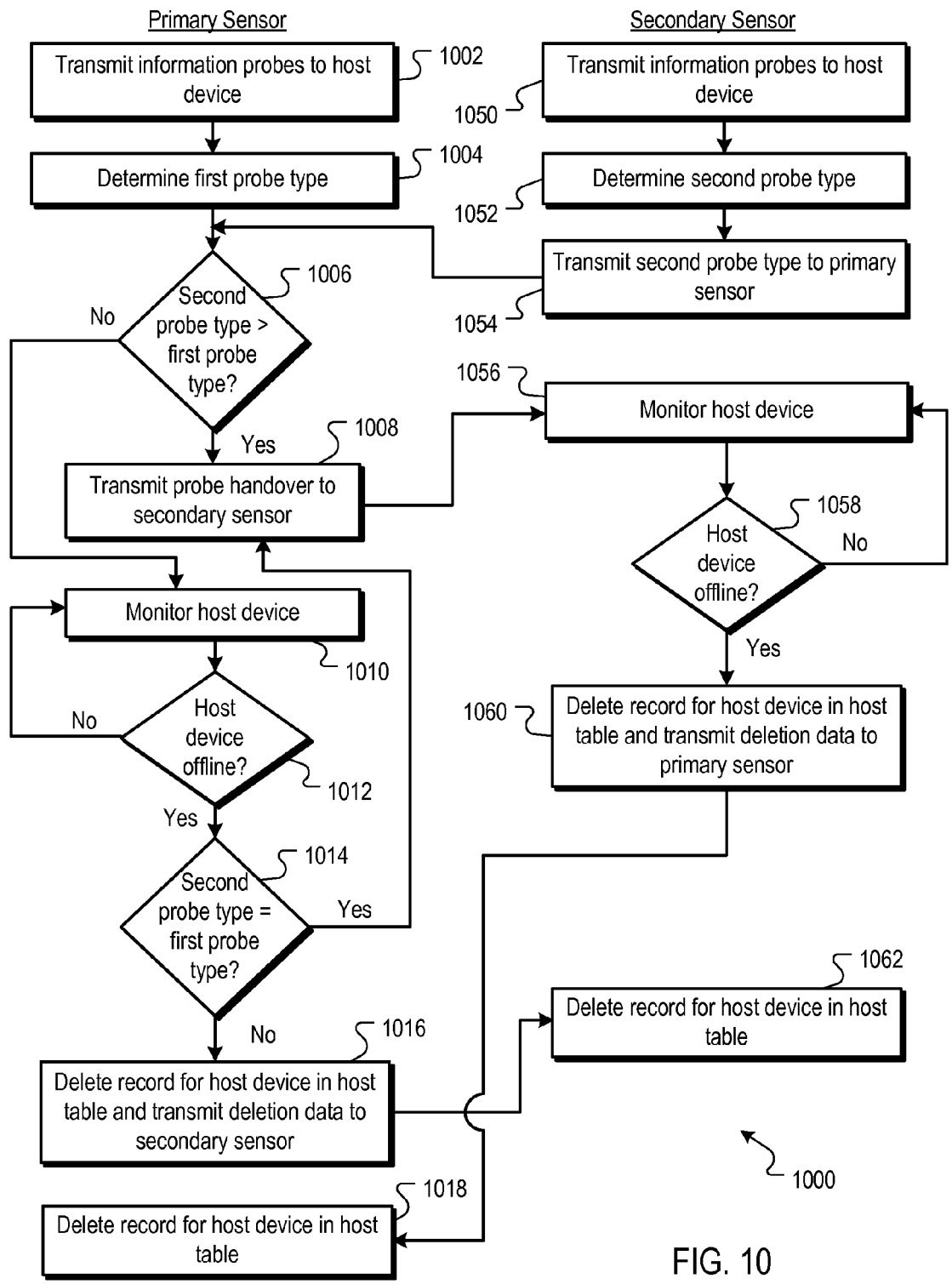
FIG. 10 is a flow diagram of an example process for allocating probing responsibilities among a pair of peer sensors.

FIG. 10 is a flow diagram of an example process 1000 for allocating probing responsibilities among a pair of peer sensors. The portions of the process 1000 under the heading "Primary Sensor" are performed in the primary sensor, and the portions of the process under the heading "Secondary Sensor" are performed in the secondary sensor.

In the primary sensor, the process 1000 transmits information probes to a host device (1002). Likewise, in the secondary sensor the process 1000 transmits information probes to the host device (1050). The primary and secondary sensors transmit information probes in response to detecting a new host device attempting to join the network.

In some implementations, all information probes available to the sensors 102 are used, e.g., an agent query, NBTSTAT, and an ICMP Ping. Additionally, the information probes are prioritized according to their probe types in a descending priority order. In one example participation, the agent query is prioritized higher than the NBTSTAT query, and the NBSTAT query is prioritized higher than the ICMP Ping.

In the primary sensor, the process 1000 determines a first probe type (1004). The first probe type is the probe type of the highest priority information probes for which a reply from the host device was received at the primary sensor. Likewise, in the secondary sensor, the process 1000 determines a second probe type (1052). The second probe type is the probe type of the highest priority information probe for which a reply from the host device was received at the secondary sensor.

In the secondary sensor, the process 1000 transmits the second probe type to the primary sensor (1054), and in the primary sensor, the process 1000 determines if the second probe type is greater than the first probe type (1006).

If a second prototype is greater than the first probe type, then the process 1000 transmits a probe handover to the secondary sensor (1008). For example, in FIG. 8, the dashed arrow 820 represents the probe handover, which allocates probing responsibility to the secondary sensor 102-B.

In response to receiving the probe hand over at the secondary sensor, the process 1000 monitors the host device (1056). For example, the secondary sensor 102-B issues information probes and listens for agent beacons.

At the secondary sensor, the process 1000 determines if the host device is off-line (1058). For example, the secondary sensor 102-B listens for replies to the information probes and/or the agent beacons. As long as replies are received, the secondary sensor 102-B continues to monitor the host device (1056).

If, however, the process 1000 determines of the host devices off-line, then the process 1000 deletes the record for the host device in the host table of the secondary sensor, and transmits the deletion data to the primary sensor (1060). At the primary sensor, in response to receiving the deletion data from the secondary sensor, the process 1000 deletes the record for the host device in the host table (1018).

Thus, in response to the secondary sensor 102-B having a probe type higher priority than the primary sensor 102-A, the secondary sensor will not request the primary sensor 102-A to try and probe the host device 110 again, as it is very likely that the host device 110 will also not respond to information probes from the primary sensor 102-A.

Returning to step 1006, if the process 1000 determines that the second probe type is not greater than the first probe type, then the process 1000 monitors the host device using the primary sensor (1010). At the primary sensor, the process 1000 determines if the host device is off-line (1012). For example, the primary sensor 102-A listens for replies to the information probes and/or the agent beacons. As long as replies are received, the primary sensor 102-A continues to monitor the host device (1010).

If, however, the process 1000 determines the host device is off-line, then the process 1000 determines if the second probe type is equal to the first probe type (1014). If the second probe type is equal to the first probe type, then the process 1000 transmits a probe hand over to the secondary sensor (1008). Thereafter, the secondary sensor monitors the host as described above.

If, however, the second probe type is not equal to the first probe, then the process 1000 deletes the record for the host device the host table, and transmits deletion data to the secondary sensor. At the secondary sensor, in response to receiving deletion data from the primary sensor, the process 1000 deletes the record for the host device in the host table the secondary sensor (1062).

In some implementations, the process 1000 also transmits the first probe type to the secondary sensor. Although in the process 1000 above the secondary sensor does not make a determination based on the probe types in response to failing to receive replies from a host device, there is the possibility that the roles of the secondary sensor and the primary sensor can be reversed, i.e., the secondary sensor can be designated the primary sensor, and the primary sensor can be designated the secondary sensor. In the event of such re-designation, the decision process of the primary sensor takes into account the probe types of the primary and secondary sensor. In variations of this implementation, the probe types are re-determined when the re-designation occurs, i.e., upon re-designation, process steps 1002, 1004, 1050, 1052 and 1054 are repeated for the newly-designated primary and secondary sensors.

§5.0 Nonce Authentication

Figure 11:
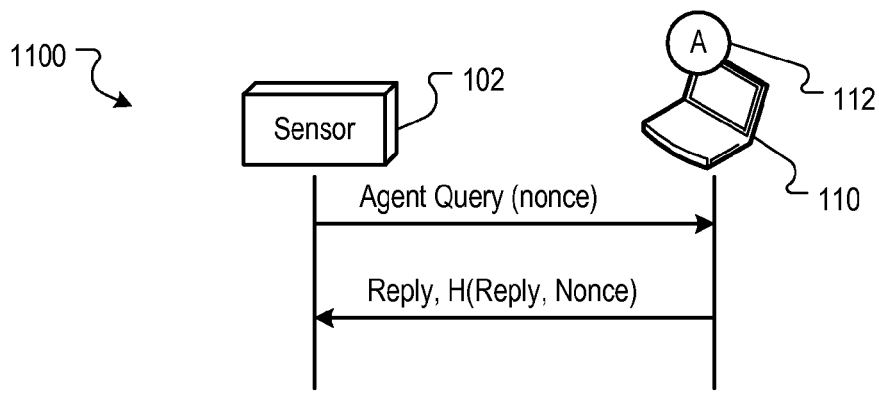
FIG. 11 is a timing diagram of a nonce-based authentication process.

FIG. 11 is a timing diagram 100 of a nonce-based authentication process. As a sensor 102 often queries a host device 110, or often redirects host devices 110 to a guest access portal, there is the potential for replay attacks. To guard against replay attacks, the sensor 102 can implement a nonce-based authentication.

For example, when a sensor 102 provides an access portal to facilitate a user login from a host device, the sensor will send a nonce to the host device when requesting authentication information, e.g., when requesting a user identifier and password within the HTTP 401 authentication realm. The host device, in turn, sends a reply that includes a login credential, such as a user identifier, an authentication code that is a hash of the user's password and the nonce Likewise, when a sensor 102 queries an agent, the sensor 102 can include a nonce with the agent query. The agent 112, when replying to the agent query, also provides an authentication code with the reply. The authentication code can, for example, be a hash of the reply and the nonce, such as a hash generated by use of the MD5 hash algorithm (or any other suitable hash algorithm, such as a hash algorithm of the SHA series, RIPEMD series, etc.). The sensor 102 then checks the authentication code by hashing the reply and the nonce. Provided the hashes match, the reply is deemed authentic.

As the sensor provides a new nonce with each presentation of the access portal or for each agent query, replay attacks are thwarted.

In some implementations, the sensor 102 maintains nonce counter that is initialized from the sensor 102 system clock. Each time a nonce is generated, the counter value is passed to a hash function and incremented. In some implementations, only the hash of a single count value is used as a nonce. In other limitations, two different counter values are hashed and combined to form the nonce. As the hash function returns a completely different hash value for each unique counter value, the hash function effectively randomizes the nonce so that predicting the next nonce is impractical for a replay attack.

§5.1 Nonce Generation

Figure 12:
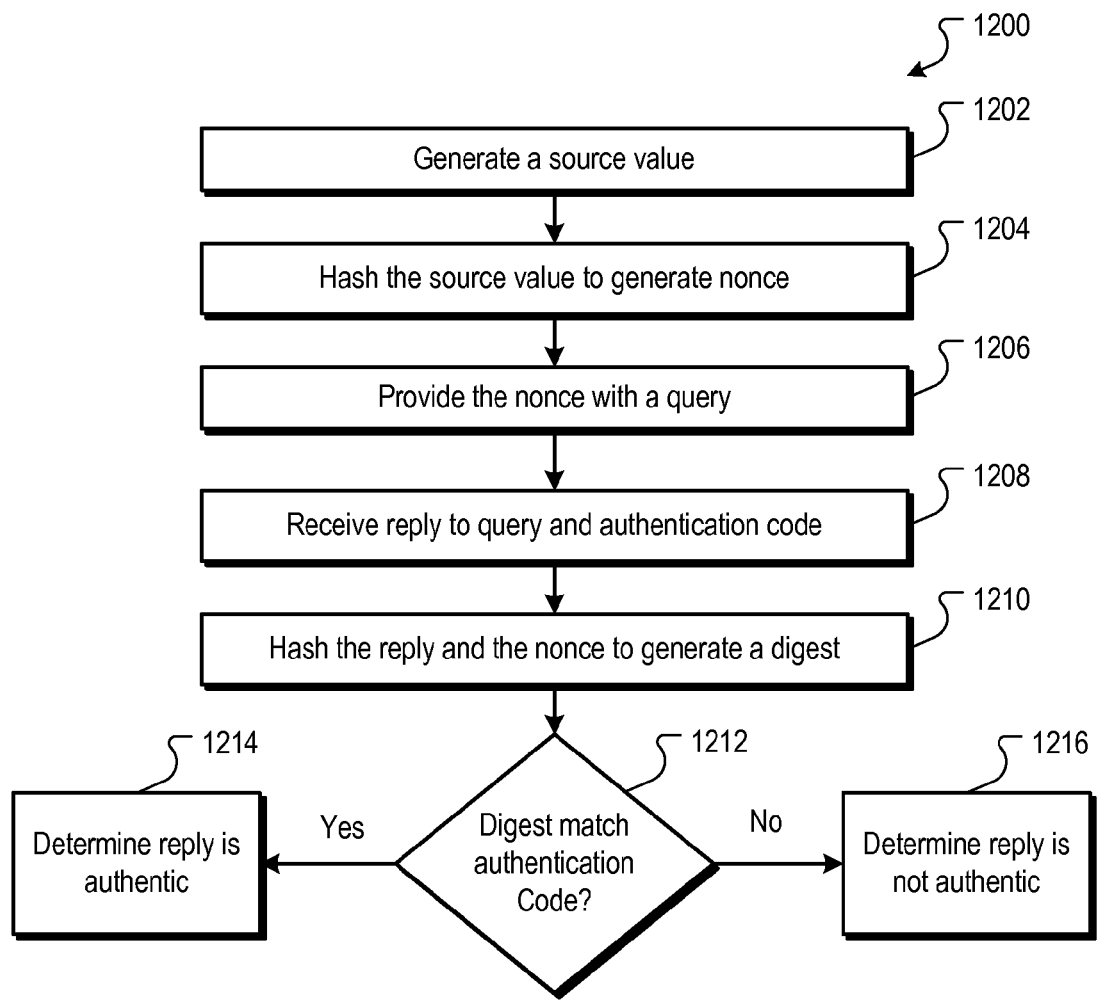
FIG. 12 is a flow diagram of an example process for generating a nonce.

FIG. 12 is a flow diagram of an example process 1200 for generating a nonce. The process 1200 generates a nonce from a single source value, and can be implemented in the sensor 102.

The process 1200 generates a source value (1202). For example, the sensor 102 can select a value of a nonce counter and increment the counter. In other implementations, the sensor can select the current system clock value.

The process 1200 hashes the source value to generate a nonce (1204). For example, the sensor 102 can hash the source value using a hash algorithm.

The process 1200 provides a nonce with query (1206). For example, the sensor 102 provides the nonce with an agent query, or can provide the nonce as part of the HTTP 401 authentication realm.

The process 1200 receives a reply to the query and an authentication code (1208). For example, the sensor 102 receives a reply an authentication code that is a hash of the reply and the nonce.

The process 1200 hashes the reply and the nonce to generate a digest (1210). For example, the sensor 102 hashes the reply and the nonce using the same hash algorithm that was used to create the authentication code.

The process 1200 determines if the digest matches the authentication code (1212). If the digest matches the authentication code, then the process 1200 determines the reply is authentic (1214). Conversely, if the digest does not match the authentication code, then the process determines the reply is not authentic (1216). For example, the sensor 102 can determine that reply to the agent query, or user credentials provided through the guest access portal 401, are authentic and continue processing communications from the host device 110 (1214). Alternatively, the sensor 102 can block further communications from the host device 110 if the reply or credentials are determined not to be authentic (1216).

Figure 13:
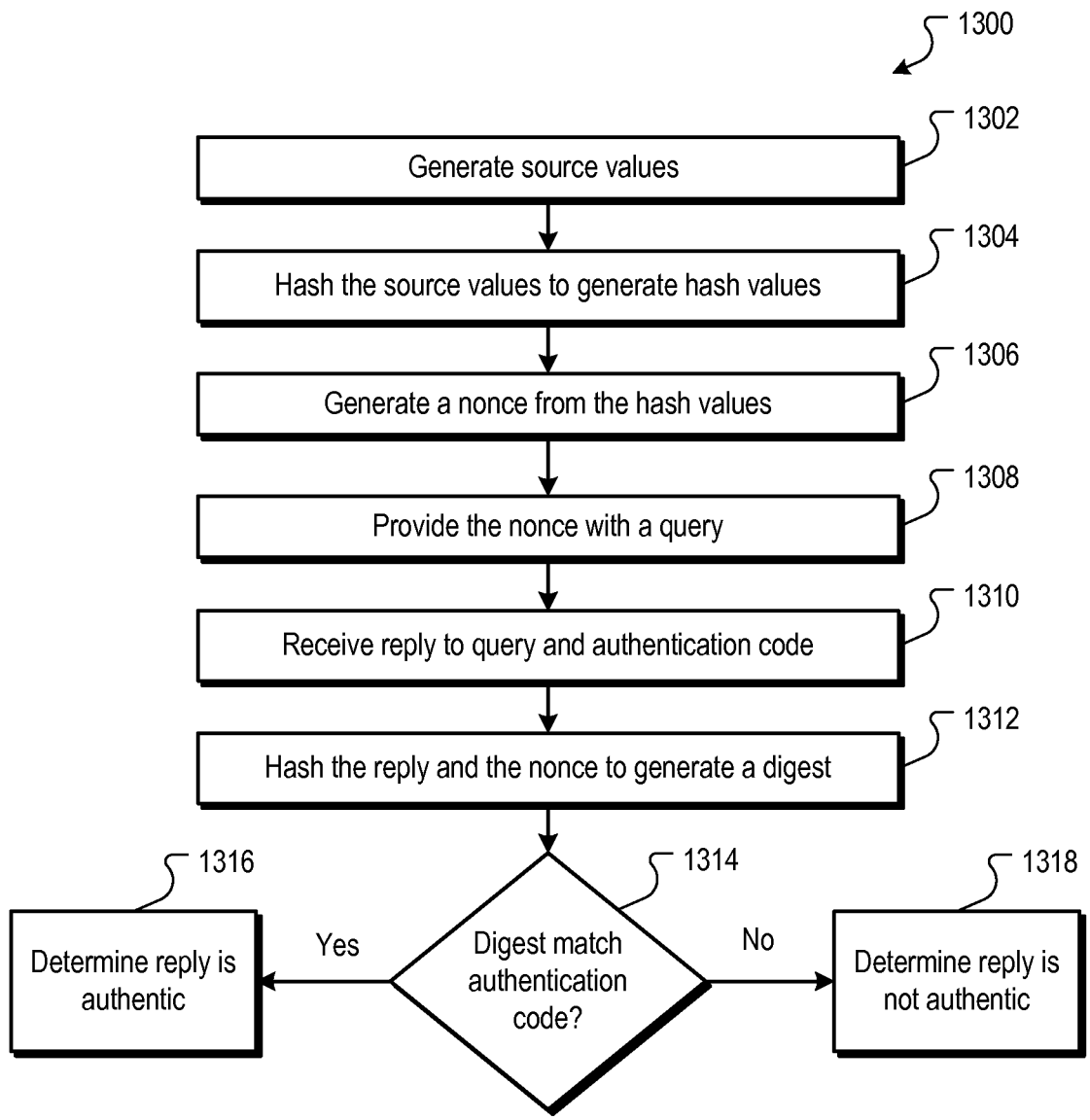
FIG. 13 is a flow diagram of another example process for generating a nonce.

FIG. 13 is a flow diagram of another example process 1300 for generating a nonce. The process 1300 generates a nonce from two or more source values, and can be implemented in the sensor 102. Generating a nonce from two or more source values makes it more difficult to predict what the next nonce will be in a replay attack, and thus provides an additional level of security.

The process 1300 generates source values (1302). For example, the sensor 102 can select two successive values of a nonce counter, or can select the system clock value and increment the system clock value to generate a second source value.

The process 1300 hashes the source values to generate hash values (1304). For example, the sensor 102 can hash each of the values to generate respective hash values.

The process 1300 generates a nonce from the hash values (1306). In some implementations, the sensor 102 can concatenate the hash values. For example, the nonce counter can be a 4-byte nonce counter, and the hashing function returns a 4-byte hash. The 4-byte hashes are concatenated to form an 8-byte nonce.

The process 1300 provides a nonce with query (1308). For example, the sensor 102 provides the nonce with an agent query, or can provide the nonce as part of the HTTP 401 authentication realm.

The process 1300 receives a reply to the query and an authentication code (1310). For example, the sensor 102 receives a reply with an authentication code that is a hash of the reply and the nonce.

The process 1200 hashes the reply and the nonce to generate a digest (1312). For example, the sensor 102 hashes the reply and the nonce using the same hash algorithm that was used to create the authentication code.

The process 1300 determines if the digest matches the authentication code (1314). If the digest matches the authentication code, then the process 1200 determines the reply is authentic (1316). Conversely, if the digest does not match the authentication code, then the process determines the reply is not authentic (1318). For example, the sensor 102 can determine that reply to the agent query, or user credentials provided through the guest access portal 401, are authentic and continue processing communications from the host device 110 (1316). Alternatively, the sensor 102 can block further communications from the host device 110 if the reply or credentials are determined not to be authentic (1318).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving data indicating a host device is connecting to a network;
    initiating a host detection phase for the host device, wherein network access for the host device is restricted during the host detection phase for the host device; and
    collecting host attributes of the host device during the host detection phase using one of at least two peer sensors, wherein collecting host attributes of the host device includes:
        transmitting a plurality of information probes to the host device, the information probes including an agent probe that attempts to identify whether one or more agents is installed on the host device, wherein each of the agents has a corresponding unique agent identifier value, attempting to identify one or more agents installed on the host device includes querying the host device for the unique agent identifier value of any agents installed on the host device, and each of the information probes requests one or more other host attributes; and
        monitoring for replies to the information probes from the host device during the host detection phase;
    wherein each of the one or more agents is configured to assess configuration of the host on which the agent is installed and report configuration information describing the configuration, the agent probe has a higher priority than other information probes in the plurality of information probes, receiving a reply to the agent probe including at least one unique agent identifier causes the host detection phase to end based on the higher priority of the agent probe, ending the host detection phase causes the other lower priority information probes in the plurality of information probes not to be resent to the host device, not receiving a reply to the agent probe after expiration of a time period causes at least a portion of the other information probes in the plurality of information probes to be resent to the host device, a repeat counter is to be incremented to indicate a number of repeat attempts of one or more of the plurality of information probes, and the host detection phase is ended upon a value of the repeat counter exceeding a maximum repeat value.

2. The method of claim 1, further comprising, during the detection phase:
    not repeating an information probe after the expiration of the time period in response to receiving a reply to the information probe, the information probe being an information probe other than the agent probe.

3. The method of claim 1, further comprising, during the detection phase:
    monitoring for an agent beacon sent from the host device during the host detection phase, the agent beacon being a data that is sent independent of the information probes; and
    ending the host detection phase in response to receiving the unique agent identifier from the agent beacon.

4. The method of claim 3, further comprising, during the detection phase:
not repeating an information probe after the expiration of the time period in response to receiving a reply to the information probe, the information probe being an information probe other than the agent probe.

5. The method of claim 3, wherein the plurality of information probes further include an NBTSTAT query.

6. The method of claim 3, wherein the plurality of information probes further include an ICMP ping.

7. The method of claim 3, wherein the agent query queries the agent identifier of the agent, the MAC address of the host device, and user login information associated with the host device.

8. The method of claim 3, wherein the agent beacon provides the agent identifier of the agent, the MAC address of the host device, and user login information associated with the host device.

9. A non-transitory computer storage medium encoded with a computer program, the program comprising instructions that when executed by data processing apparatus cause the data processing apparatus to perform operations comprising:
receiving data indicating a host device is connecting to a network;
initiating a host detection phase for the host device, wherein network access for the host device is restricted during the host detection phase for the host device; and
collecting host attributes of the host device during the host detection phase using one of at least two peer sensors, wherein collecting host attributes of the host device includes:
transmitting a plurality of information probes to the host device, the information probes including an agent probe that attempts to identify whether one or more agents is installed on the host device, wherein each of the agents has a corresponding unique agent identifier value, attempting to identify one or more agents installed on the host device includes querying the host device for the unique agent identifier value of any agents installed on the host device, and each of the information probes requests one or more other host attributes; and
monitoring for replies to the information probes from the host device during the host detection phase;
wherein each of the one or more agents is configured to assess configuration of the host on which the agent is installed and report configuration information describing the configuration, the agent probe has a higher priority than other information probes in the plurality of information probes, receiving a reply to the agent probe including at least one unique agent identifier causes the host detection phase to end based on the higher priority of the agent probe, ending the host detection phase causes the other lower priority information probes in the plurality of information probes not to be resent to the host device, not receiving a reply to the agent probe after expiration of a time period causes at least a portion of the other information probes in the plurality of information probes to be resent to the host device, a repeat counter is to be incremented to indicate a number of repeat attempts of one or more of the plurality of information probes, and the host detection phase is ended upon a value of the repeat counter exceeding a maximum repeat value.

10. The computer storage medium of claim 9, comprising further instructions that cause the data processing apparatus to perform further operations comprising:
not repeating an information probe after the expiration of the time period in response to receiving a reply to the information probe, the information probe being an information probe other than the agent probe.

11. The computer storage medium of claim 9, comprising further instructions that cause the data processing apparatus to perform further operations comprising:
monitoring for an agent beacon sent from the host device during the host detection phase, the agent beacon being a data that is sent independent of the information probes; and
ending the host detection phase in response to receiving the unique agent identifier from the agent beacon.

12. The computer storage medium of claim 11, comprising further instructions that cause the data processing apparatus to perform further operations comprising:
not repeating an information probe after the expiration of the time period in response to receiving a reply to the information probe, the information probe being an information probe other than the agent probe.

13. The method of claim 3, wherein the plurality of information probes further include an NBTSTAT query.

14. The method of claim 3, wherein the plurality of information probes further include an ICMP ping.

15. The method of claim 3, wherein the agent query queries the agent identifier of the agent, the MAC address of the host device, and user login information associated with the host device.

16. The method of claim 3, wherein the agent beacon provides the agent identifier of the agent, the MAC address of the host device, and user login information associated with the host device.

17. A data processing apparatus, comprising:
a memory subsystem, an input/output subsystem that transmits and receives data over a network, and a processor in data communication with the memory subsystem and the input/output subsystem, the processor programmed to perform operations comprising:
receiving data indicating a host device is connecting to a network;
initiating a host detection phase for the host device, wherein network access for the host device is restricted during the host detection phase for the host device; and
collecting host attributes of the host device during the host detection phase using one of at least two peer sensors, wherein collecting host attributes of the host device includes:
transmitting a plurality of information probes to the host device, the information probes including an agent probe that attempts to identify whether one or more agents is installed on the host device, wherein each of the agents has a corresponding unique agent identifier value, attempting to identify one or more agents installed on the host device includes querying the host device for the unique agent identifier value of any agents installed on the host device, and each of the information probes requests one or more other host attributes; and
monitoring for replies to the information probes from the host device during the host detection phase;
wherein each of the one or more agents is configured to assess configuration of the host on which the agent is installed and report configuration information describing the configuration, the agent probe has a higher priority than other information probes in the plurality of information probes, receiving a reply to the agent probe including at least one unique agent identifier causes the host detection phase to end based on the higher priority of the agent probe, ending the host detection phase causes the other lower priority information probes in the plurality of information probes not to be resent to the host device, not receiving a reply to the agent probe after expiration of a time period causes at least a portion of the other information probes in the plurality of information probes to be resent to the host device, a repeat counter is to be incremented to indicate a number of repeat attempts of one or more of the plurality of information probes, and the host detection phase is ended upon a value of the repeat counter exceeding a maximum repeat value.

18. The data processing apparatus of claim 17, wherein the processor is further programmed to perform operations comprising:

not repeating an information probe after the expiration of the time period in response to receiving a reply to the information probe, the information probe being an information probe other than the agent probe.

19. The data processing apparatus of claim 18, wherein the processor is further programmed to perform operations comprising:

monitoring for an agent beacon sent from the host device during the host detection phase, the agent beacon being a data that is sent independent of the information probes; and ending the host detection phase in response to receiving the unique agent identifier from the agent beacon.

20. The computer storage medium of claim 9, wherein failure to receive a reply to a respective one of the plurality of information probes causes the respective information probe to be repeated, and receiving a reply to the respective information probe causes repeats of the respective information probe to cease.

* * * * *